United States Patent
Nguyen et al.

(10) Patent No.: US 9,532,204 B2
(45) Date of Patent: Dec. 27, 2016

(54) CELLULAR NETWORK ASSISTED DEVICE TO DEVICE (D2D) DISCOVERY

(71) Applicant: NEC Corporation, Tokyo (JP)

(72) Inventors: Phong Nguyen, Victoria (AU); Pushpika Wijesinghe, Victoria (AU)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/426,066

(22) PCT Filed: Jul. 9, 2014

(86) PCT No.: PCT/JP2014/068966
§ 371 (c)(1),
(2) Date: Mar. 4, 2015

(87) PCT Pub. No.: WO2015/005498
PCT Pub. Date: Jan. 15, 2015

(65) Prior Publication Data
US 2016/0112858 A1    Apr. 21, 2016

(30) Foreign Application Priority Data

Jul. 12, 2013 (AU) ................................ 2013902574

(51) Int. Cl.
*H04W 8/00* (2009.01)
*H04W 74/00* (2009.01)
(Continued)

(52) U.S. Cl.
CPC ......... *H04W 8/005* (2013.01); *H04W 72/0446* (2013.01); *H04W 74/002* (2013.01); *H04W 92/18* (2013.01)

(58) Field of Classification Search
CPC .......................... H04W 8/005; H04W 72/0446
See application file for complete search history.

(56) References Cited

U.S. PATENT DOCUMENTS

2012/0163235 A1\* 6/2012 Ho ..................... H04W 76/023
                                                              370/254
2013/0064138 A1    3/2013 Hakola et al.
(Continued)

FOREIGN PATENT DOCUMENTS

WO    WO-2013/062310 A1    5/2013

OTHER PUBLICATIONS

3GPP TSG-RAN WG1 #73, R1-132503, Qualcomm Incorporated: "Techniques for D2D Discovery" (May 11, 2013) (7 pages).
(Continued)

*Primary Examiner* — Albert T Chou
(74) *Attorney, Agent, or Firm* — Wilmer Cutler Pickering Hale and Dorr LLP

(57) ABSTRACT

A method is disclosed for use in device-to-device (D2D) discovery in a wireless communication network. The network includes at least one base station and a plurality of D2D capable user equipments (D2D-UEs). The network also supports cellular communication and direct communication between D2D-UEs. The method includes transmitting D2D discovery system information (D2D-SIB) from the base station to D2D-UEs, wherein the D2D-SIB indicates frame(s)/subframe(s) for D2D-UEs to transmit D2D discovery request signal(s) and frame(s)/subframe(s) for D2D-UEs to transmit D2D discovery response signal(s). The method also includes transmitting one or more D2D discovery request signal(s) from one D2D-UE, and upon receipt of a said D2D discovery request signal by another D2D-UE, transmitting from said other D2D-UE one or more D2D discovery response signal(s). The D2D discovery request signal(s) and D2D discovery response signal(s) are transmitted on the frame(s)/subframe(s) indicated in the D2D-SIB.

13 Claims, 10 Drawing Sheets

(51) Int. Cl.
*H04W 72/04* (2009.01)
*H04W 92/18* (2009.01)

(56) References Cited

U.S. PATENT DOCUMENTS

| | | | |
|---|---|---|---|
| 2013/0109301 A1 | 5/2013 | Hakola et al. | |
| 2013/0170398 A1 | 7/2013 | Kwon | |
| 2014/0112194 A1* | 4/2014 | Novlan | H04W 48/16 370/254 |
| 2014/0286284 A1 | 9/2014 | Lim et al. | |
| 2014/0342747 A1* | 11/2014 | Lee | H04L 5/0053 455/450 |
| 2015/0245192 A1* | 8/2015 | Wu | H04W 8/005 370/329 |
| 2015/0296443 A1* | 10/2015 | Lim | H04W 48/12 370/312 |
| 2015/0327046 A1* | 11/2015 | Lee | H04W 56/002 370/338 |

OTHER PUBLICATIONS

International Search Report corresponding to PCT/JP2014/068966 mailed Jan. 28, 2015 (4 pages).
Written Opinion of the International Searching Authority corresponding to PCT/JP2014/068966 mailed Jan. 28, 2015 (6 pages).

\* cited by examiner

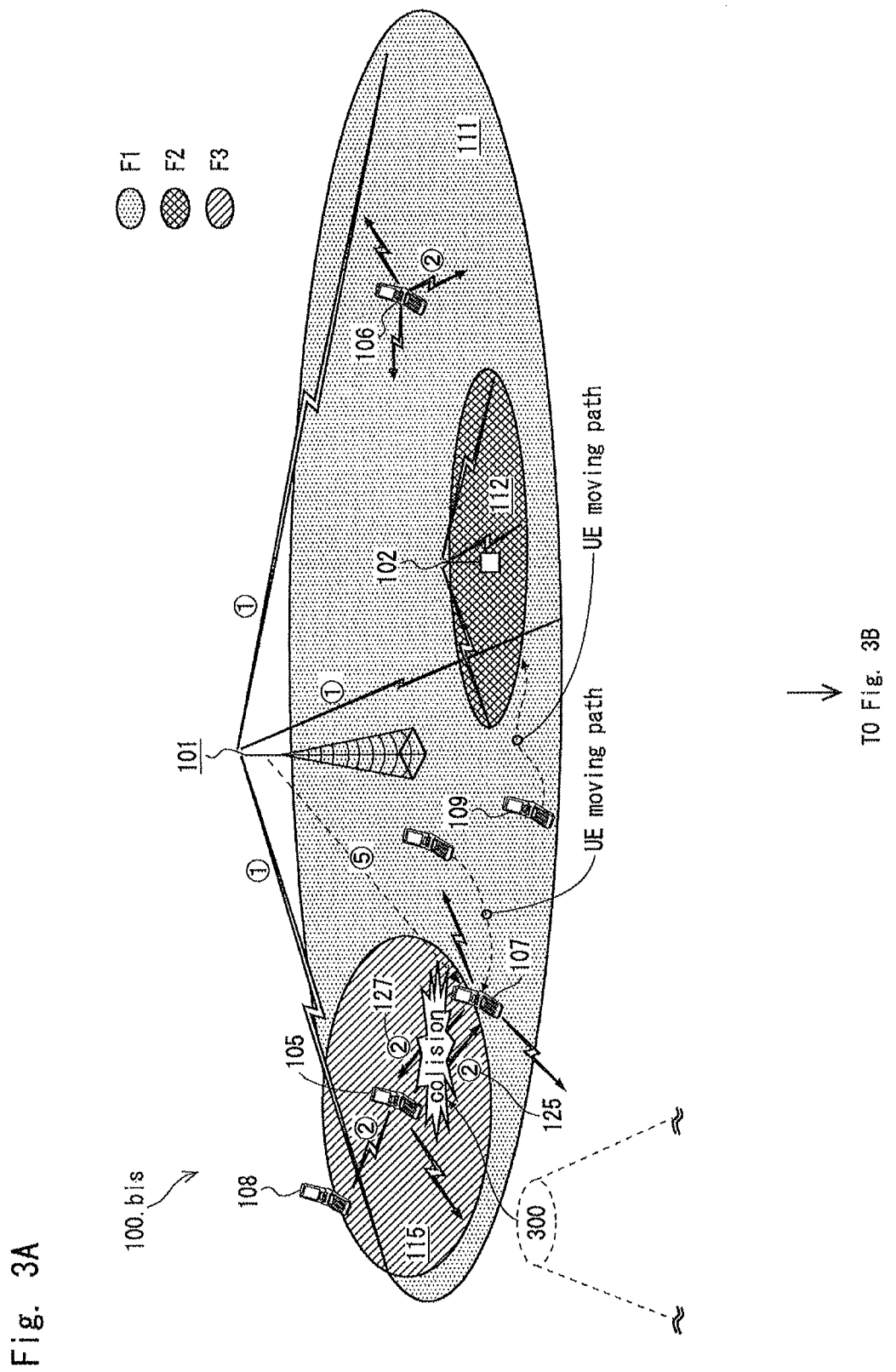

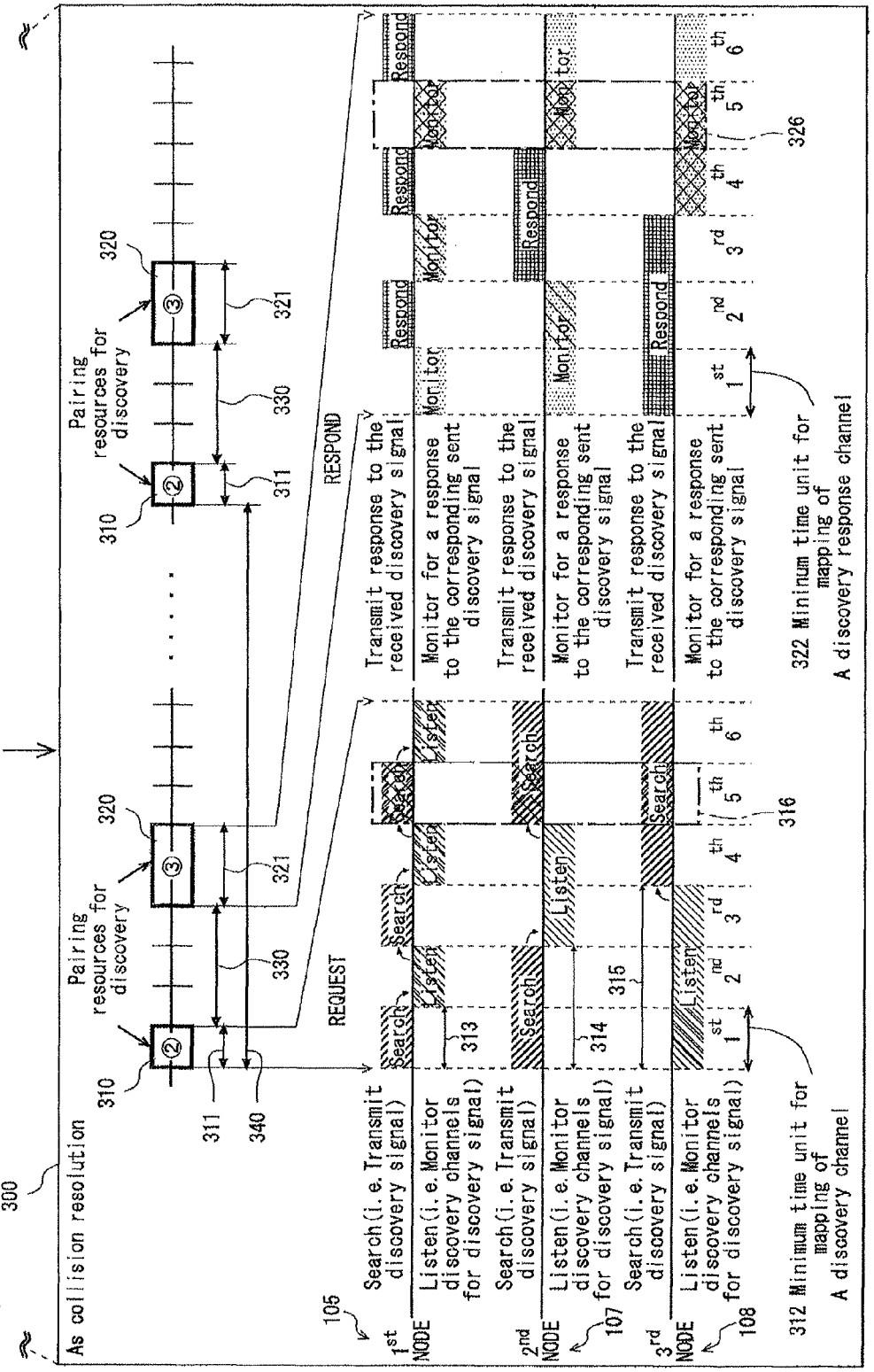

CELLULAR NETWORK ASSISTED DEVICE TO DEVICE (D2D) DISCOVERY

CROSS-REFERENCE TO RELATED APPLICATIONS

This application is a national stage Application of International Application No. PCT/JP2014/068966 entitled "Cellular Network Assisted Device to Device (D2D) Discovery," filed on Jul. 9, 2014 which claims the benefit of the priority of Australian Patent Application No. 2013902574, filed on Jul. 12, 2013, the disclosures of each of which are hereby incorporated by reference in their entirety.

TECHNICAL FIELD

The present invention relates generally to wireless communication systems, methods, apparatus and techniques, and particularly to methods, apparatus and techniques for device or peer discovery in wireless communication systems (such as, for example, cellular networks) which support both direct communication and cellular network communication.

BACKGROUND ART

Wireless communication networks have been widely deployed and utilised for the past decade or more and are expected to continue to evolve in the future to provide communication services (and content types) such as, for example, voice communication, VoIP, video, packet data, messages, multimedia, broadcast, multicast, etc. Wireless communication networks may be multiple-access networks, and types of multiple-access networks include Time Division Multiple Access (TDMA) networks, Code Division Multiple Access (CDMA) networks, Frequency Division Multiple Access (FDMA) networks, Orthogonal FDMA (OFDMA) networks, and Single Carrier FDMA (SC-FDMA) networks. A wireless communication network may also be referred to as wide area network (WAN).

A wireless communication network may include a number of base stations that can provide wireless connectivity supporting communication between a number of user equipments (UEs). A UE may communicate with a base station via the uplink (UL) and downlink (DL) channels. Downlink (also called the forward link) refers to transmissions from a base station to a UE, and uplink (also called the reverse link) refers to transmissions from a UE to a base station. Recently, there has been a trend to make available and utilise spectrum allocated to cellular networks for direct communication between UEs; that is, between one UE and another UE, or among a group of UEs within a local vicinity. This is often referred to as device-to-device or "D2D" communication (or simply "direct communication"). UEs which support direct communication may be referred to as D2D-UEs.

Direct communication may have advantages over normal cellular network communication (in the latter communications between UEs are sent via the one or more base stations). Direct communication may also coexist with the overlaid cellular network in order to improve overall system spectral efficiency. In other words, direct communication and normal cellular network communication may be supported concurrently (i.e. so that both can occur within a given wireless communication network). D2D-UEs are therefore generally capable of both cellular network communication and direct communication.

In comparison to cellular network communication, D2D communication may (at least in certain circumstances) be better suited for communicating small amounts of payload information with low overhead. Additionally, direct communication may be well suited to efficient communications in a small or localised region where channel conditions between the various devices/D2D-UEs are good or at least better than the channel condition that exists between the devices/D2D-UEs and the base station(s). Furthermore, D2D communication may allow an overlaid cellular network to offload traffic going through the base station(s) by allowing multiple paired or grouped devices/D2D-UEs to perform direct communication (i.e. between one another) sharing the same allocated block of cellular network resource. However, D2D communication may also have some limitations in comparison with cellular network communication, such as in relation to discovery, discovery range, direct communication range and change (e.g. channel change) due to device/D2D-UE mobility.

In typical cellular network communications, an access point (e.g. a base station) will generally have an antenna situated at a favourable site (e.g. with a high antenna location elevation, low obstruction, etc). The access point (base station) serves as an intermediary for UEs within its coverage. In addition, each access point (base station) is coupled via a backhaul network to other access point(s) (base station(s)) at other locations thereby providing a very large communications range. In contrast, in wireless direct communication, devices/D2D-UEs that may be interested in direct communication with each other may have less than favourable channel conditions until they are very close. This is due, for example, to their usually low antenna position which is often subjected to high levels of obstructions. As a result, the range and/or reliability of discovery between devices for direct communication can be limited. Furthermore, in typical cellular network communications, a UE knows its servicing access node (base station), and the servicing access node (base station) provides known resources for the UE to access the network and it centrally resolves collisions arising from simultaneous requests for network access. In contrast, in wireless direct communication, each device/D2D-UE behaves randomly and there is no device which performs a role as central device to resolve collisions which may occur in device discovery. This has tended to negatively impact the effectiveness and/or viability of direct communication, including when used to compliment/supplement normal cellular network communication.

It would therefore appear to be desirable to help improve discovery operations for direct communication.

It is to be clearly understood that mere reference herein to previous or existing apparatus, products, systems, methods, practices, publications or other information, or to any problems or issues, does not constitute an acknowledgement or admission that any of those things individually or in any combination formed part of the common general knowledge of those skilled in the field, or that they are admissible prior art.

SUMMARY OF INVENTION

In one broad form, the invention relates to a method for use in device-to-device (D2D) discovery in a wireless communication network, wherein the network includes at least one base station and a plurality of D2D capable user equipments (D2D-UEs) and the network supports cellular communication and direct communication between D2D-UEs, the method comprising:

broadcasting D2D discovery system information (D2D-SIB) from the base station to D2D-UEs, wherein the D2D-

SIB indicates frame(s)/subframe(s) for D2D-UEs to transmit and/or monitor for D2D discovery request signal(s) and frame(s)/subframe(s) for D2D-UEs to transmit and/or monitor for D2D discovery response signal(s), and transmitting one or more D2D discovery request signal(s) from one D2D-UE, and upon receipt of a said D2D discovery request signal by another D2D-UE, transmitting from said other D2D-UE one or more D2D discovery response signal(s), said D2D discovery request signal(s) and said D2D discovery response signal(s) being transmitted on the frame(s)/subframe(s) indicated in the D2D-SIB.

The D2D discovery system information (D2D-SIB) mentioned above may—indicate one or more D2D resource-block sets, with each D2D resource-block set comprising a pair of resource blocks. The said pair may comprise a first resource block for transmitting and/or monitoring for discovery request signal(s) and a second resource block for transmitting and/or monitoring for discovery response signal(s). The first resource block and the second resource block may be time-multiplexed. Via D2D-SIB, the base station may share one or more D2D resource-block sets for D2D broadcasting. In this case, only authorised D2D-UE(s) can utilise the shared D2D resource-block set in broadcasting D2D message(s) while other unauthorised D2D-UE(s) within transmission range can only listen to the broadcasting D2D message(s) on shared D2D resource-block set.

It is envisaged that the first resource block and the second resource block will usually be allocated within the network's cellular uplink resource. However, the invention is not necessarily limited to this, and therefore the first and second resource blocks need not necessarily be allocated within the network's cellular uplink resource.

The first resource block may itself comprise a plurality of time-multiplexed discovery channels. Where this is so, each time-multiplexed discovery channel may in turn comprise one or more frequency-multiplexed discovery channels, or one or more code-multiplexed discovery channels, which can be transmitted by a D2D-UE. In other words, there may be one or more frequency-multiplexed discovery channels on a given time-multiplexed discovery channel, and such a discovery channel may be referred to as a time-frequency multiplexed discovery channel. Likewise, there may be one or more code-multiplexed discovery channels on a given time-multiplexed discovery channel, and such a discovery channel may be referred to as a time-code multiplexed discovery channel. For each time-frequency multiplexed discovery channel, or each time-code multiplexed discovery channel, there may be a unique corresponding discovery response channel on which a discovery response signal can be transmitted by another D2D-UE. Suitably, the unique corresponding discovery response channel may be mapped within the second resource block discussed above.

The D2D discovery system information (D2D-SIB) mentioned above may include the following information elements (IEs):

access class barring information (D2D-ac-BarringInfo) for controlling use by a D2D-UE of a D2D resource-block set;

D2D discovery subframe configuration information (D2D-Discovery-SubframeConfig) enabling D2D-UEs to utilise a sleep mode to conserve power, and to periodically wake up from sleep mode to perform D2D discovery;

a maximum discoverable interval value (Max-Discoverable-Interval-Value) defining an integer maximum number of time multiplexed discovery channels that a D2D-UE can select as its own discoverable interval; and a minimum discoverable interval value (Min-Discoverable-Interval-Value) defining an integer minimum number of time multiplexed discovery channel(s) that a D2D-UE can select as its own discoverable interval.

The D2D-Discovery-SubframeConfig mentioned above may further include:

radio frame allocation period discovery information (radioframeAllocationPeriodDiscovery) and radio frame allocation offset discovery information (radioframeAllocationOffsetDiscovery), which indicate radio frame(s) in which the first resource block in a D2D resource-block set is/are mapped, the first resource block being mapped in radio frame(s) for which the equation $$\text{SFN mod(radioframeAllocationPeriodDiscovery)} = \text{radioframeAllocationOffsetDiscovery}$$

is satisfied; SFN is the network system frame number;

discovery response offset information (DiscoveryResponseOffset) indicating the radio frame(s) that contain the associated second resource block of the said D2D resource-block set;

subframe allocation discovery information (subframeAllocationDiscovery) defining the subframes that are allocated for D2D discovery channel(s) mapping within the radio frame allocation period defined by radioframeAllocationPeriodDiscovery and radioframeAllocationOffsetDiscovery;

resource block assignment discovery information (resourceBlockAssignmentDiscovery) indicating physical resource block(s) in the subframe(s) that are allocated for D2D discovery channel(s) mapping;

subframe allocation response information (subframeAllocationResponse) defining the subframes that are allocated for D2D discovery response channel(s) mapping within radio frame allocation period defined by discoveryResponseOffset, and resource block assignment response information (resourceBlockAssignmentResponse) indicating physical resource block(s) in the subframe(s) that are allocated for D2D discovery response channel(s) mapping.

In amended form of the invention discussed above, for frames)/subframe(s) not reserved for transmitting D2D discovery request signal(s) and corresponding D2D discovery response signal(s), if a D2D-UE does not have other scheduled cellular network activity on these frame(s)/subframe(s) then the D2D-UE may enter a sleep mode to conserve power. However, the D2D-UE may also periodically wake up from sleep mode prior to incoming frame(s)/subframe(s) that are reserved for transmitting D2D discovery request signal(s) and corresponding D2D discovery response signal(s) in order to perform D2D discovery to discover other nearby D2D-UE(s) and/or in order to be discovered by other nearby D2D-UE(s). Preferably, the period of sleep mode may be determined from the radioframeAllocationPeriodDiscovery, radioframeAllocationOffsetDiscovery, subframeAllocationDiscovery and subframeAllocationResponse provided in the D2D-SIB as discussed above.

A D2D-UE may determines whether it is allowed to use an upcoming D2D resource-block set for D2D discovery from the D2D-ac-BarringInfo which is provided in the D2D-SIB as discussed above. A D2D-UE may also randomly select its own discoverable interval in the range from the Min-Discoverable-Interval-Value to the Max-Discoverable-Interval-Value provided in the D2D-SIB.

It is envisaged that, at least in most embodiments, a D2D-UE will randomly select either a "SEARCH" state or a "LISTEN" state to begin D2D discovery. If the "SEARCH" state is selected the D2D-UE will transmit a D2D discovery request signal on a selected discovery channel. On the other hand, if the "LISTEN" state is selected the D2D-UE will monitor all predetermined discovery channels for a D2D discovery request signal from another D2D-UE.

More specifically, if the "SEARCH" state is selected, then for each time-multiplexed discovery channel(s) within the duration of the D2D-UE's own discoverable interval the D2D-UE may transmit one or more D2D discovery request signal(s) on randomly selected frequency-multiplexed or code-multiplexed discovery channel(s). On the other hand, if the "LISTEN" state is selected, then for each time-multiplexed discovery channel(s) within the duration of the D2D-UE's own discoverable interval the D2D-UE may monitor all available frequency-multiplexed or code-multiplexed discovery channels for a D2D discovery request signal.

The D2D-UE may then switch from the initially selected "SEARCH" state or "LISTEN" state to the other of the "LISTEN" state or "SEARCH" state. More specifically, the D2D-UE may switch from the initially selected "SEARCH" state or "LISTEN" state to the other of the "LISTEN" state or "SEARCH" state at the end of its own discoverable interval. Preferably, the D2D-UE will alternate between the "SEARCH" state and the "LISTEN" state on its own discoverable interval basis for the duration of the network configured discovery interval defined by subframeAllocationDiscovery provided in the D2D-SIB.

In another broad form, the invention relates to a wireless communication network including at least one base station and a plurality of D2D capable user equipments (D2D-UEs), wherein the network supports cellular communication and direct communication between D2D-UEs, the base station broadcasts D2D discovery system information (D2D-SIB) to D2D-UEs, wherein the D2D-SIB indicates frame(s)/subframe(s) for D2D-UEs to transmit and/or monitor for D2D discovery request signal(s) and frame(s)/subframe(s) for D2D-UEs to transmit and/or monitor for D2D discovery response signal(s), and a D2D-UE transmits one or more D2D discovery request signal(s), and upon receipt of a said D2D discovery request signal by another D2D-UE, the said other D2D-UE transmits one or more D2D discovery response signal(s), said D2D discovery request signal(s) and said D2D discovery response signal(s) being transmitted on the frame(s)/subframe(s) indicated in the D2D-SIB.

Further comments relating to the invention are set out below.

In general, the invention is concerned with methods and techniques for performing D2D discovery under cellular network assistance. It is thought that the invention may help to enable D2D communication, efficient D2D discovery and/or better device power saving. One feature of (at least some embodiments of) the invention is that the base station may allocate resources and broadcast same as D2D system information. The base station may broadcast cell system information for D2D-UEs to further receive D2D system information.

As explained above, it is proposed that the cellular network allocated resources for D2D discovery may comprise two time-multiplexed resource blocks forming a pair in a resource-blocks set, with the first resource block being for D2D-UE(s) transmitting and/or monitoring 'discovery request signal' and the second resource block being for D2D-UE(s) transmitting and/or monitoring 'discovery response message'. The paired resource blocks for D2D discovery will preferably (although not necessarily) be allocated within cellular network uplink (UL) resources. The paired resource blocks for D2D discovery may be dedicated resource or resource shared with regular cellular UE(s).

The proposed D2D system information is discussed above. Further to the above discussion, the D2D system information may comprise:

'access class barring information' controlling access to a particular resource-block set allocated for D2D discovery by D2D-UE of different types or for different services; since a particular resource block set can be shared for D2D broadcasting. In such case, 'access class barring information' may indicate if the allocated resource block is for discovery for broadcasting;

'D2D resource-block sets scheduling information' to allow RRC-IDLE D2D-UE(s) to derive scheduling information on 'D2D resource-block sets' and to further utilise 'sleep mode' to conserve its scarce power and periodically wake-up briefly at predetermined time intervals to discover, and/or be discovered by, other RRC-IDLE D2D-UE(s) within the local vicinity; and 'D2D discovery parameters and network assigned values' that may be used by a D2D-UE(s) in performing D2D discovery to achieve a high or improved probability of discovering, and/or being discovered by, other D2D-UE(s) within the local vicinity.

The proposed 'D2D resource-block set(s) scheduling information' may comprise:

'radio frame allocation period discovery' to indicate the macro interval of time in number of radio frames that at least one resource-block set for D2D discovery may be allocated;

'radio frame allocation offset discovery' to indicate radio frame(s) in the 'radio frame allocation period discovery' that contains the first resource-block for D2D discovery wholly or partially. There may be more than one value indicating 'radio frame allocation offset discovery' and each value may represent one resource-block set configuration that may be allocated to a specific group of D2D-UEs or specific D2D service(s);

'discovery respond offset' to indicate the radio frame that contains the associated second resource-block for D2D discovery wholly or partially;

'subframe allocation discovery' to indicate the subframes that are allocated for D2D discovery channel(s) mapping within the first resource-block;

'resource block assignment discovery' to indicate physical resource block(s) in the subframe(s) that are allocated for D2D discovery channel(s) mapping;

'subframe allocation response' to indicate the subframes that are allocated for D2D discovery response channel(s) mapping within the second resource-block;

'resource block assignment response' to indicate physical resource block(s) in the subframe(s) that are allocated for D2D discovery response channel(s) mapping;

'D2D discovery parameters and network assigned values' may further comprise:

'Maximum Discoverable Interval Value' to indicate maximum number of consecutive time-multiplexed discovery channel(s) that a D2D-UE is allowed to operate in one state (i.e. "SEARCH" state or "LISTEN" state);

'Minimum Discoverable Interval Value' to indicate minimum number of consecutive time-multiplexed discovery channel(s) that a D2D-UE is allowed to operate on one state.

Hence, a D2D-UE in network RRC-IDLE may periodically read the proposed 'D2D system information' or 'D2D system information update'. Based on the broadcast 'D2D resource-blocks set(s) scheduling information', a D2D-UE may choose to enter sleep mode to conserve power and periodically (or upon user intervention) wake-up prior to a radio frame(s) that contains a scheduled D2D resource-block set to perform the discovery procedure.

A D2D-UE may start the discovery procedure by using the network provided 'access class barring information' to check whether it is allowed to use the upcoming D2D resource-block set for D2D discovery. If a D2D-UE is not allowed to use the immediately upcoming D2D resource-block set for D2D discovery, it may re-enter sleep mode and wake up before the next network scheduled discovery resource for a new discovery attempt.

If a D2D-UE is allowed to use the immediately upcoming D2D resource-blocks set for D2D discovery, and based on 'D2D resource-blocks set(s) scheduling information', it may determine the 'D2D discovery interval=A' in terms of number of time-multiplexed discovery channel(s). A D2D-UE may further choose 'its own discoverable interval=D' by randomly selecting an integer 'D' between network configured 'Maximum Discoverable Interval Value=B' and 'Minimum Discoverable Interval Value=C'.

A D2D-UE may further randomly select either "SEARCH" or "LISTEN" state to begin. Upon the first coming time-multiplexed discovery channel, if a D2D-UE selects the "SEARCH" state, it may further select a frequency or code multiplexed discovery channel for transmitting its discovery request signal. The D2D-UE may repeat the "SEARCH" state's action for the remaining 'D−1' time-multiplexed discovery channel(s) then switch to the "LISTEN" state for D time-multiplexed discovery channel(s) duration to monitor all available frequency or code multiplexed discovery channel(s) for a discovery request signal. Else if a D2D-UE initially selects the "LISTEN" state, it may monitor all available frequency or code multiplexed discovery channel(s) for a discovery request signal. The D2D-UE may then repeat the "LISTEN" state's action for the remaining 'D−1' time-multiplexed discovery channel(s) then switch to the "SEARCH" state for D time-multiplexed discovery channel(s) duration. A D2D-UE may alternate between the "SEARCH" and "LISTEN" states until the network configured discovery interval 'A' elapses.

Corresponding to a discovery channel selected for sending a discovery request signal, a D2D-UE may monitor the associated discovery response channel for discovery response signals(s). A D2D-UE may detect none, one or more than one discovery response messages from different D2D-UE(s) on a monitored discovery response channel. Discovery response messages from different D2D-UEs sent on a discovery response channel may be separated by orthogonal sequences of same network configured group. Corresponding to a discovery channel on which a discovery request signal is detected, a D2D-UE may transmit a discovery response message on the associated discovery response channel. A D2D-UE may be considered as having been discovered when its discovery response message has been successfully detected by another D2D-UE. Optionally, during the discovery interval 'A', a D2D-UE may observe the number of times and also discovery channels on which it detects 'discovery request signal' from a particular D2D-UE. The said D2D-UE may just randomly select one associated discovery response channel for transmitting the discovery response message. Upon discovering a D2D-UE within its local vicinity, a D2D-UE may send a request for D2D connection configuration from its servicing base station and monitor cellular network DL channel for D2D communication Grant.

Any of the features described herein can be combined in any combination with any one or more of the other features described herein within the scope of the invention.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 1 also contains a block diagram representation of functional modules in a typical cellular and D2D capable mobile node (i.e. a D2D-UE).

FIG. 3A illustrates a wireless communication system in which a pair of nearby D2D-UEs both begin discovery by simultaneously selecting the SEARCH state and also the same discovery channel for transmitting their discovery request message, thus leading to a collision. FIG. 3A also contains a diagram used to explain, by way of example, a mechanism that may help to address or reduce the collision problem.

FIG. 3B illustrates a wireless communication system in which a pair of nearby D2D-UEs both begin discovery by simultaneously selecting the SEARCH state and also the same discovery channel for transmitting their discovery request message, thus leading to a collision. FIG. 3B also contains a diagram used to explain, by way of example, a mechanism that may help to address or reduce the collision problem.

DESCRIPTION OF EMBODIMENTS

Figure 1:
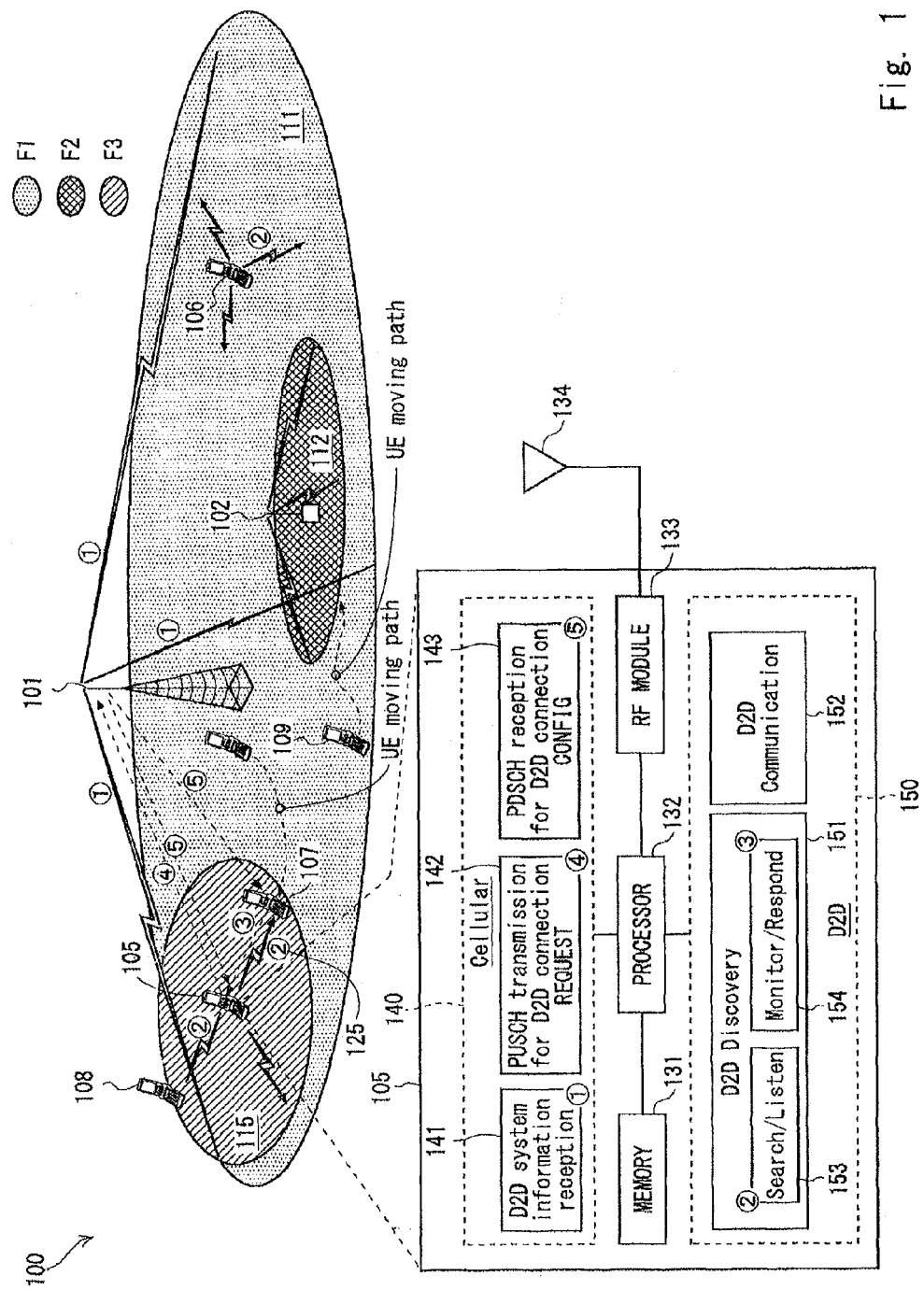
FIG. 1 schematically illustrates a wireless communications network/system of a type in which embodiments of the invention may be beneficially used or employed.

FIG. 1 schematically illustrates a wireless communications network/system 100. (The terms "network" and "system" may be used interchangeably herein unless the context necessarily requires otherwise.) The network 100 is of a type in which embodiments of the invention may be beneficially used or employed. The network 100 is a heterogeneous network comprising access nodes 101 and 102. The access node 101 is (or represents) a macro base station, and the access node 102 is (or represents) a pico base station. There is also a plurality of UEs 105-109, each of which is capable of performing normal cellular communication and also direct communication. Hence, the UEs 105-109 are so called D2D-UEs.

Macro base station 101 serves macro-cell 111 over a first carrier frequency F1. Pico base station 102 serves pico-cell 112 over a second carrier frequency F2. Device discovery (a.k.a D2D discovery) and Direct (or D2D) communication between D2D-UE(s) can occur over a third carrier frequency F3 within a local vicinity or area that may be small, such as area 115 around a D2D-UE 105. The carrier frequency F3 may be the same as the first carrier frequency F1 or the second carrier frequency F2, or it may be a carrier frequency dedicated for device discovery and/or direct communication between mobile nodes within the local vicinity. These options may depend on the preference of, or they may be determined or configured by, the mobile network operator.

If the carrier frequency F3 is the same as the first carrier frequency F1 or the second carrier frequency F2, a mobile node (D2D-UE) may utilise cellular resources such as cellular uplink resource for D2D discovery. Also, in this situation, a D2D-UE may utilise cellular resources such as cellular uplink resource or cellular downlink resource for D2D communication. The usage of cellular network resources may be configurable. Furthermore, the 1st carrier frequency F1 and the 2nd carrier frequency F2 could be the same or different.

FIG. 1 illustrates the example situation where a mobile node (D2D-UE) 108 is outside the coverage of access node 101. In other words, D2D-UE 108 in FIG. 1 is outside macro-cell 111 and is therefore outside the coverage of base station 101. However, reliable data connectivity in this situation may still be possible for D2D-UE 108 using direct communication because D2D-UE 108 is in the vicinity of another mobile node, namely D2D-UE 105, and D2D-UE 105 is within the serving range of macro base station 101 for D2D discovery and/or D2D communication. FIG. 1 also illustrates the example situation where a mobile node (D2D-UE) 107 (which is within macro cell 111) moves into the vicinity of another mobile node (the latter again being D2D-UE 105) thus enabling discovery and/or direct communication between those two D2D-UEs. It will be understood that the D2D-UEs 105-109 in FIG. 1 may support D2D features/functions enabling them to discover each other, and to directly communicate with each other, with some cellular network assistance.

One novel feature or aspect of at least some embodiments of the invention is that D2D-UE 105 (for example) only performs discovery for other D2D-UE(s) within its local vicinity under certain conditions. In one example of this, D2D-UE 105 first obtains D2D 'discovery related system information' (D2D-SIB) from base station 101 such that it can identify frame(s)/subframe(s) on which discovery channel(s) and corresponding discovery response channel(s) are mapped. This corresponds to 1 in FIG. 1-3B. For frames/subframes that are not reserved for mapping of discovery channel(s) and corresponding discovery response channel(s), if the D2D-UE 105 does not have other scheduled cellular network activity on these frames/subframes then the D2D-UE 105 enters sleep mode to conserve power. The D2D-UE 105 will, however, periodically wake-up immediately prior to incoming frame(s)/subframe(s) that are reserved for discovery channel(s) mapping.

On frame(s)/subframe(s) that are reserved for discovery channel(s) mapping, the D2D-UE 105 selects one of two options: it either performs 'SEARCH' by sending a discovery request signal/message on a selected discovery channel(s), or it performs 'LISTEN' by monitoring all available discovery channel(s) for a discovery request signal(s)/message(s). This corresponds to 2 in FIG. 1-3B. As well as sending a discovery request signal/message on a selected discovery channel(s) (2 in FIG. 1-3B), D2D-UE 105 monitors the corresponding discovery response channel(s) for a discovery response message associated with its previously sent discovery request signal/message. Upon detection of a response message associated with its previously sent discovery request signal/message (3 in FIG. 1-2B), D2D-UE 105 sends preliminary D2D link quality and a request for D2D connection configuration to its serving base station 101 (4 in FIG. 1-2B) using a cellular network UL channel such as PUSCH. After sending the request for D2D connection configuration, D2D-UE 105 monitors a cellular network DL channel such as PDSCH for a D2D connection grant (5 in FIG. 1-3B).

FIG. 1 also contains a block diagram representing a typical cellular and D2D capable mobile node (D2D-UE), like D2D-UE 105 for example. As shown therein, a D2D-UE like D2D-UE 105 includes:

a memory 131 containing program instructions and databases;
 a processor 132;
 a radio frequency (RF) module 133 having a transmitter and a receiver;
 an antenna (or multiple antennae) 134 for transmitting and receiving cellular and/or D2D radio frequency signals;
 a D2D system information reception module 141 for performing reception and decoding of system information broadcast by a base station intended for D2D discovery;
 a Search/Listen module 153 for determining frame(s)/subframe(s), and discovery channel(s), on which a D2D-UE 105 will either perform 'SEARCH' by sending a discovery request signal/message, or perform 'LISTEN' by monitoring all discovery channels for a discovery request signal/message;
 a Monitor/Respond module 154 for determining frame(s)/subframe(s), and discovery response channel(s), on which a D2D-UE 105 will perform:
  'MONITOR' by listening to a selected discovery response channel(s) corresponding to discovery channel(s) previously used for sending discovery request signal; and/or
  'RESPOND' by sending a message in response to a detected discovery request signal(s) on a selected discovery response channel(s) corresponding to a discovery channel(s) on which a discovery request signal has been detected;
 D2D Connection REQUEST module 142 for utilising a cellular UL channel such as PUSCH to send a REQUEST for D2D connection configuration to the serving base station; and
 D2D connection CONFIG module 143 for monitoring a cellular DL channel such as PDSCH for D2D communication configuration from the base station.

The various modules above (or at least some of them) are functional modules and may be implemented by software, firmware or hardware, or any combination thereof. Cellular base stations may comprise similar modules for broadcasting D2D system information, for reception of D2D Connection REQUESTs sent from D2D-UEs, and for transmission of D2D connection GRANTs to D2D-UEs. In a D2D-UE, the functional modules, when executed by the processor 132, operate (including with each other) to allow the D2D-UE to periodically read D2D system information, and to determine frame(s)/subframe(s)/physical resource block(s) and physical channel(s) for performing D2D discovery.

Figure 2A:
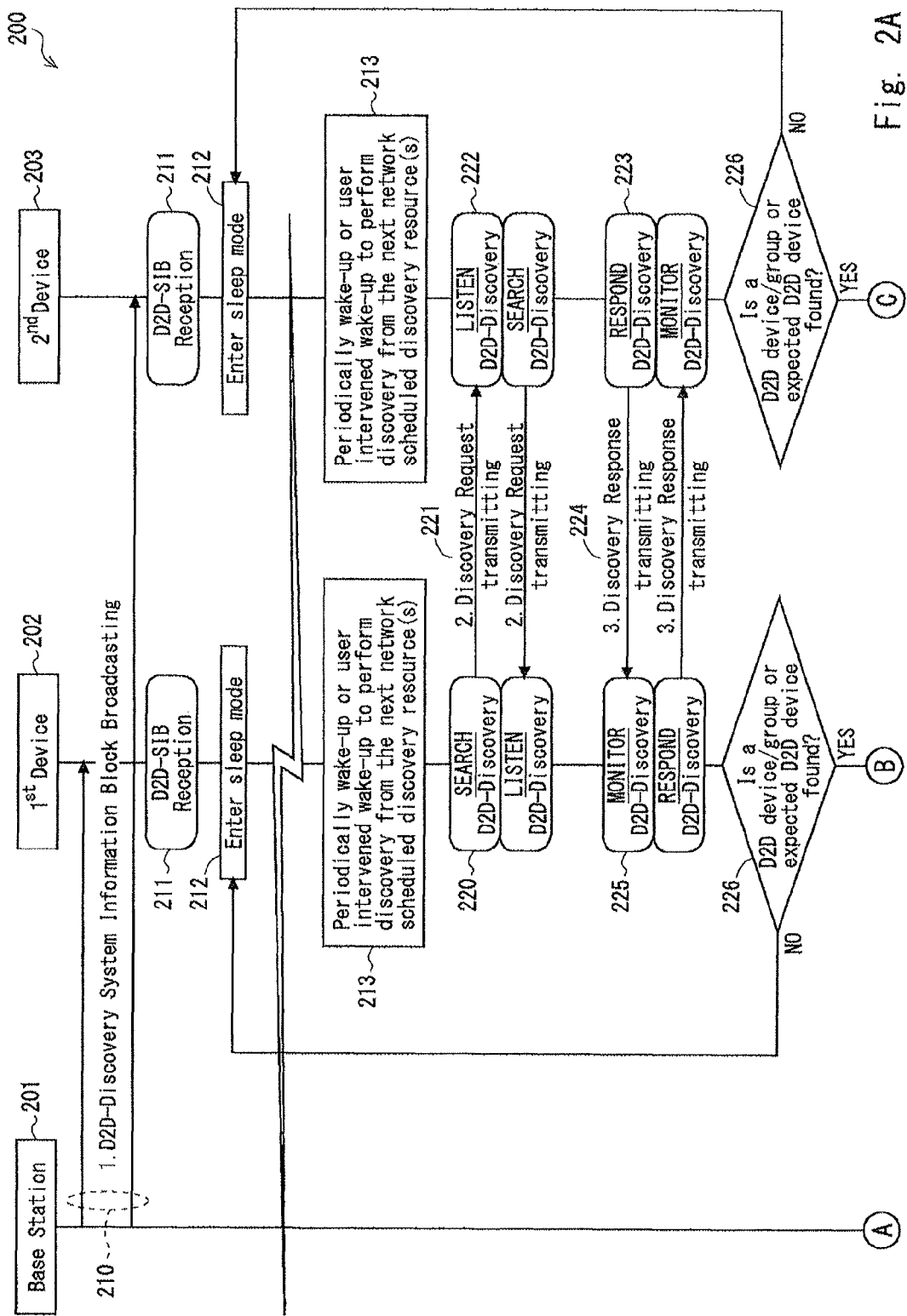
FIG. 2A contains a flow diagram representing a method/procedure introduced initially with reference to FIG. 1.
Figure 2B:
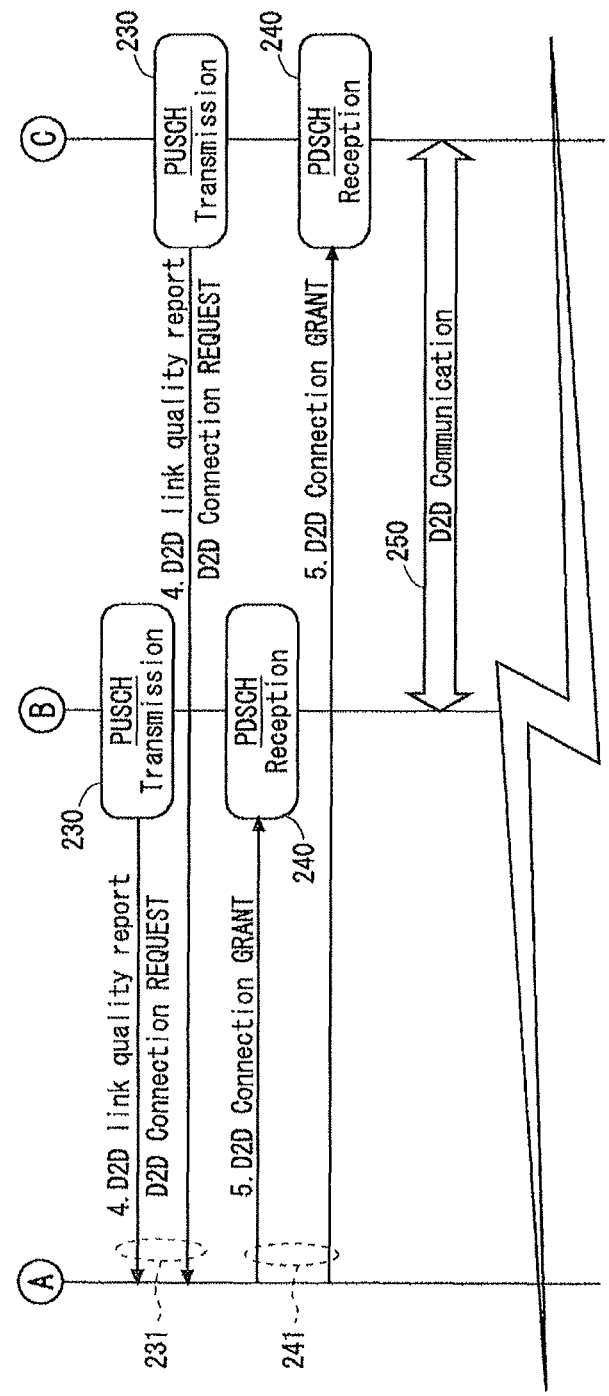
FIG. 2B contains a flow diagram representing a method/procedure introduced initially with reference to FIG. 1.

The method/procedure introduced briefly above is explained in more detail below with reference to FIGS. 2A and 2B. The procedure 200 represented in FIGS. 2A and 2B involves a base station 201, a first D2D-UE as $1^{st}$ device 202 and a second D2D-UE as $2^{nd}$ device 203.

Firstly, the base station 201 (being a base station which supports D2D service) will periodically broadcast D2D system information 210 on a pre-scheduled frame(s), subframe(s), and resource block(s) known or detectable by D2D-UE(s) within the signalling coverage of the base station 201.

D2D capable mobile node(s) such as $1^{st}$ device 202 and $2^{nd}$ device 203 will independently determine frame(s) and subframe(s) on which to monitor the cellular DL channel for D2D system information (or D2D system information update) 211 in the form of D2D-SIB (D2D-SIB is discussed further below).

Based on D2D discovery system information 211 sent on D2D-SIB, a D2D-UE such as $1^{st}$ device 202 or $2^{nd}$ device 203 may enter sleep mode 212 to conserve power.

However, D2D-UEs such as $1^{st}$ device 202 and $2^{nd}$ device 203 will wake up 213 from sleep mode 212 (they may do so periodically, at predetermined time intervals, and/or upon user intervention) to perform a D2D discovery procedure on the immediately next coming network scheduled discovery resources.

On frames)/subframe(s) and resource block(s) that are allocated for discovery channel(s) mapping, a D2D-UE (say $1^{st}$ device 202) selects a "SEARCH" state 220 wherein it sends its Discovery Request message 221 on a selected discovery channel. Concurrently, a D2D-UE (say $2^{nd}$ device 203) selects a "LISTEN" state 222 wherein it monitors all available discovery channels for any Discovery Request messages such as Discovery Request message 221.

Upon detection of a Discovery Request signal/message 221, the $2^{nd}$ device 203 (in this example) selects a 'RESPOND' state 223 and sends a Discovery Response message 224 on a predetermined/associated Discovery Response channel corresponding to the Discovery channel on which it received the Discovery Request message 221. Concurrently, the $1^{st}$ device 202 (in this example) selects a 'MONITOR' state 225 wherein it listens to the associated Discovery Response channel corresponding to the Discovery channel on which it sent a Discovery Request message 221 for a Discovery Response message 224.

Upon detection 226 of a D2D-UE such as $2^{nd}$ device 203 (in this example) within close proximity, the $1^{st}$ device 202 requests cellular network access to transmit, on a cellular UL channel such as PUSCH 230, the preliminary observed D2D link quality report and a D2D connection request message 231 to base station 201. Otherwise, upon non-detection 226 by the $1^{st}$ device 202 of a D2D-UE within close proximity, the $1^{st}$ device 202 re-enters sleep mode 212 and again wakes up prior to the next occurrence of the network scheduled discovery resource(s) (or upon user intervention) to make further discovery attempts.

Assuming a nearby D2D-UE such as $2^{nd}$ device 203 is detected by the $1^{st}$ device 202, then after sending the preliminary observed D2D link quality report and D2D connection request 231 to the base station 201, the $1^{st}$ device 202 monitors the corresponding cellular DL subframe for a D2D connection GRANT 241. After the D2D connection GRANT 241 is received, 1st device 202 and $2^{nd}$ device 203 are able to commence direct/D2D communication 250 with one another.

Importantly, the system method/procedure described above with reference to FIGS. 2A and 2B assumes an ideal scenario where one D2D-UE ($1^{st}$ device 202) has selected the "SEARCH" state to start the discovery procedure and another nearby D2D-UE ($2^{nd}$ device 203) has concurrently selected the "LISTEN" state to start the discovery procedure. There is therefore no collision. However, in wireless environments more generally, each mobile node/D2D-UE may behave randomly and/or independently, and it is therefore possible/likely that more than one D2D-UE within a local vicinity may concurrently select the same state, i.e. 'SEARCH' or 'LISTEN', as illustrated by D2D-UEs 105 and 107 in the system 100.bis in FIGS. 3A and 3B. In system 100.bis in FIGS. 3A and 3B, D2D-UE 105 and D2D-UE 107 both simultaneously select the SEARCH state and also concurrently select the same discovery channel for transmitting their discovery request message. Consequently, neither D2D-UE 105 nor 107 can "hear" the other, and this results in the situation that they cannot discover each other or are not discoverable.

It is presently proposed, at least in some embodiments of the invention, to implement a mechanism in a mobile node (D2D-UE) that may help to address or reduce this problem. This is described further below by way of example with reference to the diagram 300 in FIGS. 3A and 3B.

The diagram 300 illustrates that, in this embodiment at least, the method which aims to reduce the collision problem above involves using cellular network allocated paired resource-blocks for D2D discovery. The paired resource-blocks for D2D discovery comprise a resource block allocated for transmitting discovery request 310 and a corresponding resource block allocated for transmitting discovery response 320. The resource block for discovery request 310 and the associated resource block for discovery response 320 are time-multiplexed and offset (i.e. separated) by a time gap 330. The cellular network periodically (i.e. at time intervals 340) maps the paired resource-blocks on radio frame(s) and subframe(s) that are known for all (or at least a group of) D2D-UEs within its coverage (e.g. within macro cell 111 in range of base station 101).

The discovery request resource-block 310, having a time duration 311 spanning multiple slot(s) or subframe(s), itself further comprises more than one time-multiplexed discovery channel 312. Each time-multiplexed discovery channel 312 may comprise more than one Physical Resource Block (PRB) allowing mapping of more than one frequency-multiplexed and/or code-multiplexed discovery channel. (This is discussed further below.) Similarly, the discovery response resource-block 320, having a time duration 321 spanning multiple slot(s) or subframe(s), itself further comprises more than one time-multiplexed associated discovery response channel(s) 322 corresponding to a time-multiplexed discovery channel 312.

In diagram 300, D2D-UE 105 is (or operates as) the $1^{st}$ node, D2D-UE 107 is (or operates as) the $2^{nd}$ node, and D2D-UE 108 is (or operates as) the $3^{rd}$ node. These D2D-UEs are all within the same local vicinity 115 and are eligible for discovering and/or being discovered.

In the embodiment described with reference to FIGS. 3A and 3B, the network provides both (i) a minimum discoverable interval value as an integer number of a time-multiplexed discovery channels, and (ii) a maximum discoverable interval value again as an integer number of a time-multiplexed discovery channels.

Prior to each occurrence of a periodically scheduled discovery resource block, each D2D-UE will randomly select its own discoverable interval, this being within the range from the network configured minimum discoverable interval value to the network configured maximum discoverable interval value. Each D2D-UE will further randomly select either the 'SEARCH' state or the 'LISTEN' state to begin its discovery procedure and will then alternatingly switch between the 'SEARCH' and 'LISTEN' states for the duration of the network configured discoverable interval.

In diagram 300 in FIGS. 3A and 3B, the $1^{st}$ node 105 randomly selects one time-multiplexed discovery channel unit as its own discoverable interval 313. The $1^{st}$ node 105 also randomly selects the 'SEARCH' state to begin and transmits its discovery request message on a randomly selected or assigned frequency-multiplexed/code-multiplex discovery channel. After the $1^{st}$ node's first selected discoverable interval 313 elapses, the $1^{st}$ node switches to the 'LISTEN' state and monitors all frequency-multiplexed/code-multiplex discovery channels for a discovery request message during the $1^{st}$ node's second selected discoverable interval. The 1st node will then alternatingly switch between the 'SEARCH' state and 'LISTEN' state for the remaining network-configured discoverable interval i.e. four time-multiplexed discovery channel units.

At the same time, the $2^{nd}$ node 107 randomly selects two time-multiplexed discovery channel units as its own discoverable interval 314. The $2^{nd}$ node 107 also randomly selects the 'SEARCH' state to begin and transmits its discovery request message on a randomly selected or assigned frequency-multiplexed/code-multiplex discovery channel during each time-multiplexed discovery channels within its selected discoverable interval. After the $2^{nd}$ node's first selected discoverable interval 314 elapses, the $2^{nd}$ node switches to the 'LISTEN' state and monitors all frequency-multiplexed/code-multiplex discovery channels for a discovery request message during the $2^{nd}$ node's second selected discoverable interval. The $2^{nd}$ node will then alternatingly switch between the 'SEARCH' state and 'LISTEN' state for the remaining network configured discoverable interval i.e. two time-multiplexed discovery channel units. (FIG. 6 and FIG. 7 both contain diagrams further illustrating two possible discovery channel selections associated with a selected discoverable interval of two time-multiplexed discovery channel units.)

Concurrent with the above, the $3^{rd}$ node 108 randomly selects three time-multiplexed discovery channel units as its own discoverable interval 315. Unlike the $1^{st}$ and $2^{nd}$ nodes in this example, the $3^{rd}$ node 108 randomly selects the 'LISTEN' state to begin and monitors all frequency-multiplexed/code-multiplex discovery channels for a discovery request message during the first three time-multiplexed discovery channels. After the $3^{rd}$ node's first selected discoverable interval 315 elapses, the $3^{rd}$ node switches to the 'SEARCH state and transmits its discovery request message on a randomly selected or assigned frequency-multiplexed/code-multiplex discovery channel during each time-multiplexed discovery channels within its selected discoverable interval.

Possible outcomes in the example discussed above with reference to diagram 300 include the following:

In the first time-multiplexed discovery channel, the $1^{st}$ node and $2^{nd}$ node may collide with each other if they both select the same frequency/code-multiplexed channel for transmitting their respective discovery requests. On the other hand, in the said first time-multiplexed discovery channel, the $3^{rd}$ node may detect discovery requests from both the $1^{st}$ node and the $2^{nd}$ node if their respective discovery requests are transmitted on different frequency/code-multiplexed channels. In fact, the $3^{rd}$ node may detect a discovery request from either the $1^{st}$ node or the $2^{nd}$ node, even if their respective discovery requests are transmitted on the same frequency/code-multiplexed channel, provided the respective signals from the $1^{st}$ node and the $2^{nd}$ node are resolvable. On the other hand, the $3^{rd}$ node may not detect discovery requests from either the $1^{st}$ node or the $2^{nd}$ node if their respective discovery requests transmitted on the same frequency/code-multiplexed channel are not resolvable.

In the second time-multiplexed discovery channel, only the $2^{nd}$ node transmits a discovery request, while at the same time both the $1^{st}$ node and the $3^{rd}$ node perform monitoring and may detect discovery request from the $2^{nd}$ node. This may result in a collision of discovery responses transmitted simultaneously from both the $1^{st}$ node and the $3^{rd}$ node if both the $1^{st}$ node and the $3^{rd}$ node happen to select the same scrambling sequence (e.g. same orthogonal code) to use when responding to the detected discovery request.

In the third time-multiplexed discovery channel, only the $1^{st}$ node transmits a discovery request, while at the same time both the $2^{nd}$ node and the $3^{rd}$ node perform monitoring and may detect the discovery request from the $1^{st}$ node. This may result in a collision of discovery responses transmitted simultaneously from both the $2^{nd}$ node and the $3^{rd}$ node if both the $2^{nd}$ node and the $3^{rd}$ node happen to select the same scrambling sequence (e.g. same orthogonal code) to use when responding to the detected discovery request.

In the fourth time-multiplexed discovery channel, only the $3^{rd}$ node transmits a discovery request, while at the same time both the $1^{st}$ node and the $2^{nd}$ node perform monitoring and may detect the discovery request from $3^{rd}$ node. This may result in a collision of discovery responses transmitted simultaneously from both the $1^{st}$ node and the $2^{nd}$ node if both the $1^{st}$ node and the $2^{nd}$ node happen to select the same scrambling sequence (e.g. same orthogonal code) to use when responding to the detected discovery request.

In the fifth time-multiplexed discovery channel, all three of the mobile nodes transmit discovery requests, and hence their respective discovery requests are not detectable by the other nodes.

In the sixth time-multiplexed discovery channel, the $2^{nd}$ node and the $3^{rd}$ node may collide with each other if both select the same frequency/code-multiplexed channel for transmitting their respective discovery requests. On the other hand, in the sixth time-multiplexed discovery channel, the $1^{st}$ node may detect discovery requests from both the $2^{nd}$ node and the $3^{rd}$ node if their respective discovery requests are transmitted on different frequency/code-multiplexed channels. In fact, the $1^{st}$ node may detect a discovery request from either the $2^{nd}$ node or the $3^{rd}$ node, even if their respective discovery requests are transmitted on the same frequency/code-multiplexed channel, provided the respective signals from the $2^{nd}$ node and the $3^{rd}$ node are resolvable. On the other hand, the $1^{st}$ node may not detect a discovery request from either the $2^{nd}$ node or the $3^{rd}$ node if their respective discovery requests are transmitted on the same frequency/code-multiplexed channel and are not resolvable.

It will be appreciated that, whilst the mechanism explained by way of example above (with reference to diagram 300) does not remove the possibility of collisions entirely, nevertheless the chance of avoiding a collision and achieving successful discovery is improved in comparison with the situation illustrated in system 100.*bis*.

Figure 4:
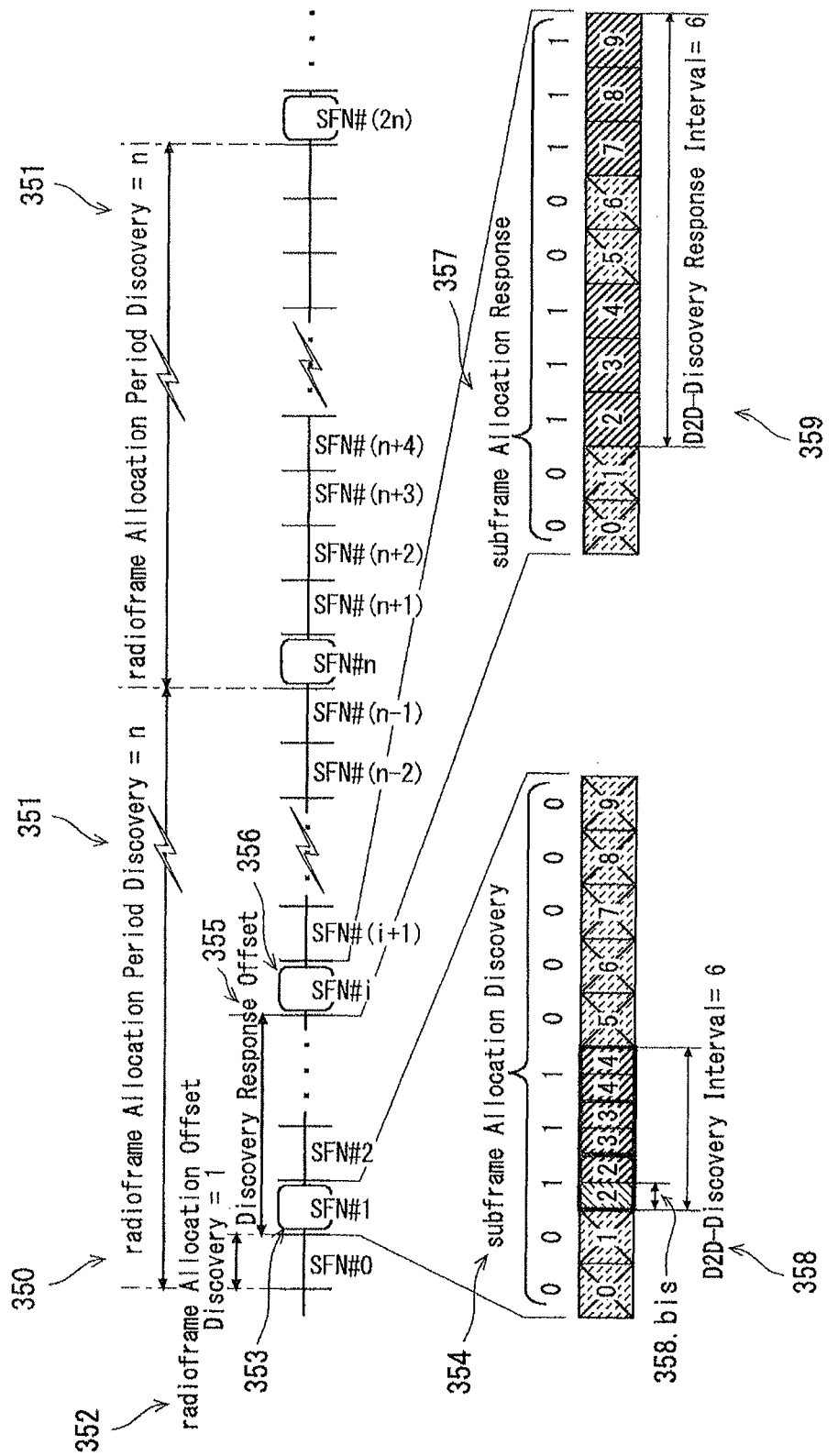
FIG. 4 is a diagrammatic representation of a proposed system information structure.

Certain aspects and/or embodiments of the invention also relate to the system information structure(s) used in D2D discovery signalling. FIG. 4 illustrates a system information structure 350 in accordance with one possible embodiment. As explained above, system information supporting D2D discovery is broadcast in the form of a D2D System Information Block (SIB), such as D2D-SIB 350, by a serving cellular base station that supports D2D service and/or public safety service. Depending on the demand for D2D service and/or public safety service and/or special event(s), a cellular base station may broadcast D2D-SIB as frequently as every 8, 16, 32, 64, 128, 256, 512, or 1024 radio frames.

The broadcast D2D-SIB may comprise at least the following Information Elements (IEs):

D2D-ac-BarringInfo as D2D access class barring information, which may be designed in the form of access class MASK(s). D2D-ac-BarringInfo may further comprise D2D-ac-BarringForPS (i.e. access class barring information for Public Safety), D2D-ac-BarringForGC (i.e. access class barring information for General Case) and D2D-Broadcast. D2D-ac-BarringForGC may further comprise options for different D2D services, and D2D-Broadcast may indicate the resource block set is reserved for D2D-broadcasting.

Max-Discoverable-Interval-Value as an integer to define the maximum number of time multiplexed discovery channel(s) that a mobile node is allowed to select.

Min-Discoverable-Interval-Value as an integer to define the minimum number of time multiplexed discovery channel(s) that a mobile node is allowed to select.

D2D-Discovery-SubframeConfig as an IE to indicate Radio-frames that contain D2D discovery subframe(s) and D2D discovery response subframe(s). D2D-Discovery-SubframeConfig may further comprise:

radioframeAllocationPeriodDiscovery 351, and radioframeAllocationOffsetDiscovery 352 to indicate radio frames 353 that contain D2D discovery subframes. Radio frames that contain D2D discovery subframes 353 occur when the equation $$\text{SFN mod(radioFrameAllocationPeriodDiscovery)} = \text{radioFrameAllocationOffsetDiscovery}$$

is satisfied. radioframeAllocationPeriodDiscovery 351 may have value n4, n16, n64, n256, n512, n1024. Value n4 for radioframeAllocationPeriodDiscovery denotes value 4, n16 denotes value 16, and so on.

DiscoveryResponseOffset 355 to indicate the radio frames 356 that contain D2D discovery response subframes. DiscoveryResponseOffset may have value n0, n1, n2, n3, n4.

subframeAllocationDiscovery 354 is a bit string with size 10 or 40 to define the subframes that are allocated for D2D discovery channel(s) mapping within a radio frame allocation period defined by the radioframeAllocationPeriodDiscovery and radioframeAllocationOffsetDiscovery.

resourceBlockAssignmentDiscovery to indicate Physical Resource Block(s) in the subframe(s) that are allocated for D2D discovery channel(s) mapping.

subframeAllocationResponse 357 is the bit string of size 10 or 40 to define the subframes that are allocated for D2D discovery response channel(s) mapping within a radio frame allocation period defined by the DiscoveryResponseOffset 355.

resourceBlockAssignmentResponse to indicate Physical Resource Block(s) in the subframe(s) that are allocated for D2D discovery response channel(s) mapping.

Figure 5A:
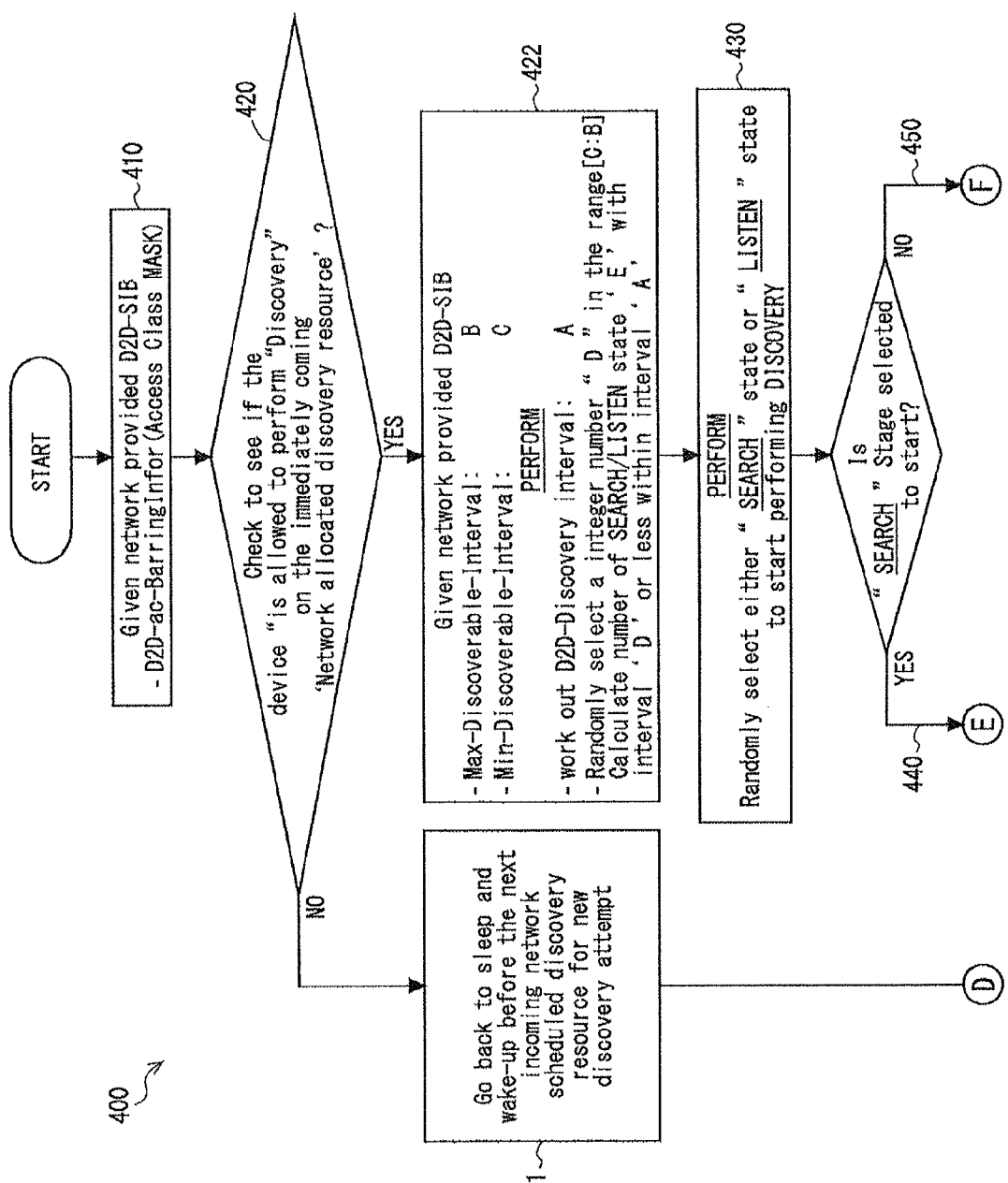
FIG. 5A illustrates a discovery method/algorithm which may be implemented by a D2D capable device (e.g. a D2D-UE) to perform D2D discovery under the control of the overlaid cellular network.
Figure 5B:
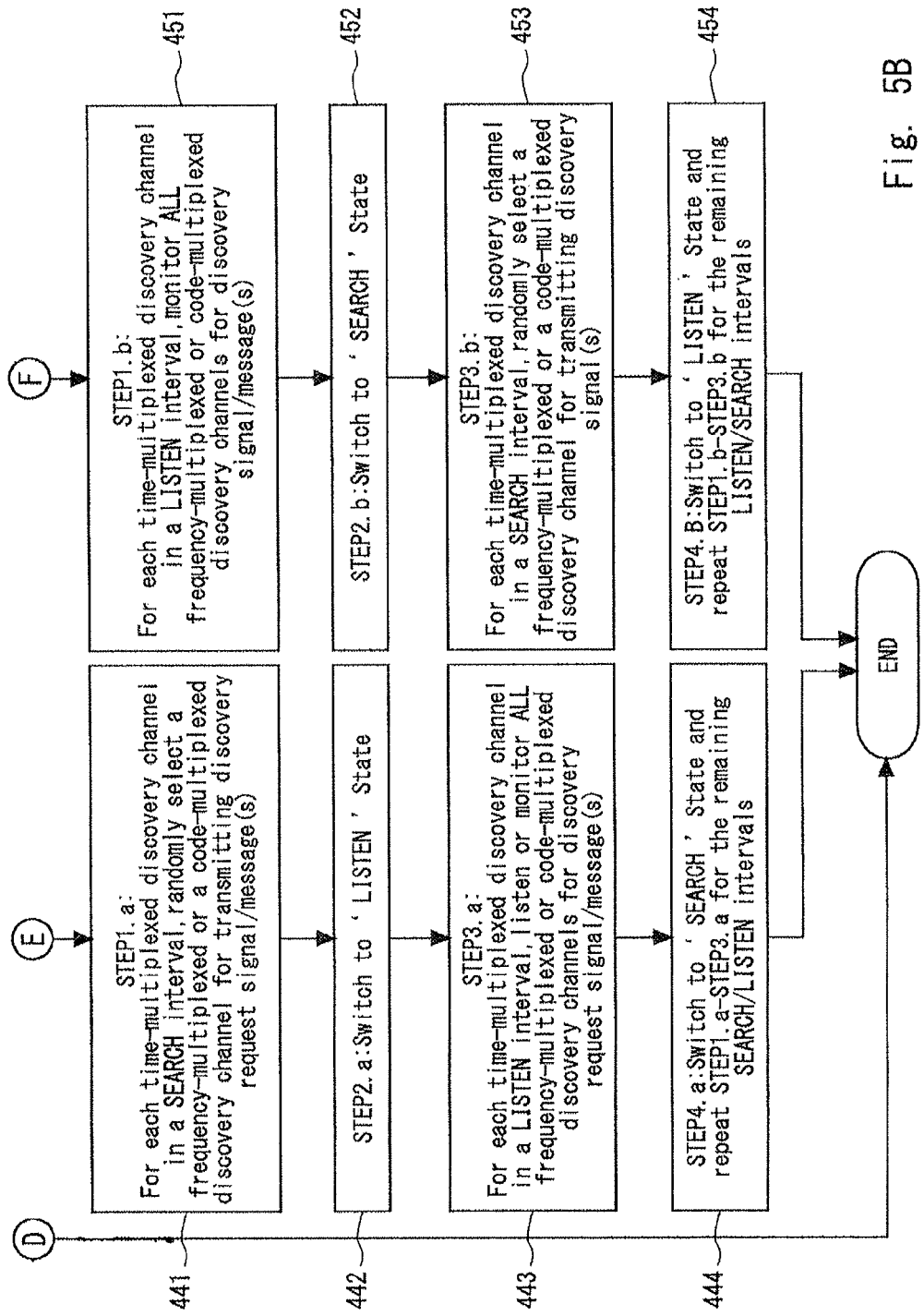
FIG. 5B illustrates a discovery method/algorithm which may be implemented by a D2D capable device (e.g. a D2D-UE) to perform D2D discovery under the control of the overlaid cellular network.

Certain aspects and/or embodiments of the invention also relate to a discovery algorithm, which may be implemented within the Search/Listen module 153 (see FIG. 1) of a D2D-UE such as mobile node/D2D-UE 105. FIGS. 5A and 5B illustrates a discovery method/algorithm 400 in accordance with one possible embodiment, implemented by a D2D capable device (e.g. a D2D-UE), to perform D2D discovery under the control of the overlaid cellular network.

The method 400 starts by (step 410) retrieving the D2D system information (D2D-SIB) given by the network (i.e. received from the base station). The D2D system information may include an access class barring MASK, as in the proposed D2D-SIB discussed above. The access class barring MASK may indicate whether the D2D-UE is allowed to perform discovery in the upcoming network allocated discovery resource (step 420). If a device (D2D-UE) does not satisfy the access class barring information, that device is not allowed to perform discovery in the upcoming network allocated discovery resource. The device will therefore re-enter sleep mode and wake-up at a later time before the start of the next network scheduled discovery resource (or upon user interruption) for a new discovery attempt (step 421). Otherwise (i.e. if at step 420 the device satisfies the access class barring information and is therefore allowed to perform discovery in the upcoming network allocated discovery resource) the device performs the discovery procedure set out below.

In step 422, the device randomly selects an integer number "D" from the range [C:B] where C is the minimum discoverable interval and B is the maximum discoverable interval configured (i.e. provided) by the network via D2D-SIB. The value of D provides the duration of one Discoverable interval for the device. The device further calculates the number of SEARCH/LISTEN states "E" with interval "D" within the D2D-Discovery interval "A" which is derived from the network provided 'D2D-Discovery-SubframeConfig' IE.

In step 430, the device randomly selects either the SEARCH state or the LISTEN state to start discovery.

If the SEARCH state is selected, as shown on branch 440:

In STEP1.*a* 441, for each time-multiplexed discovery channel in the SEARCH interval, the device randomly selects a frequency-multiplexed or code-multiplexed discovery channel and transmits its discovery request signal/message;

In STEP2.*a* 442, at the end of the SEARCH interval, the device switches to the LISTEN state;

In STEP3.*a* 443, for each time-multiplexed discovery channel in the LISTEN interval, the device listens to all frequency-multiplexed or code-multiplexed discovery channels for other devices' discovery request signal(s)/message(s); and In STEP4.*a* 444, at the end of the LISTEN interval, the device switches back to the SEARCH state and repeats STEP1.*a* to STEP3.*a* for the remaining SEARCH/LISTEN intervals.

If, on the other hand, the LISTEN state is selected in step 430, as shown on branch 450:

In STEP1.*b* 451, for each time-multiplexed discovery channel in the LISTEN interval, the device listens to all frequency-multiplexed or code-multiplexed discovery channels for other devices' discovery request signal(s)/message(s);

In STEP2.b 452, at the end of the LISTEN interval, the device switches to the SEARCH state;

In STEP3.b 453, for each time-multiplexed discovery channel in the SEARCH interval, the device randomly selects a frequency-multiplexed or code-multiplexed discovery channel and transmits its discovery request signal; and In STEP4.b 454, at the end of the SEARCH interval, the device switches back to the LISTEN state and repeats STEP1.b to STEP3.b for the remaining LISTEN/SEARCH intervals.

Certain aspects and/or embodiments of the invention related to D2D discovery also involve a method for multiplexing discovery channels. One particular embodiment of the method for multiplexing discovery channels is described below with reference to the examples illustrated in FIG. 6 (applicable for FDD and TDD) and FIG. 7 (applicable for TDD only).

Figure 6:
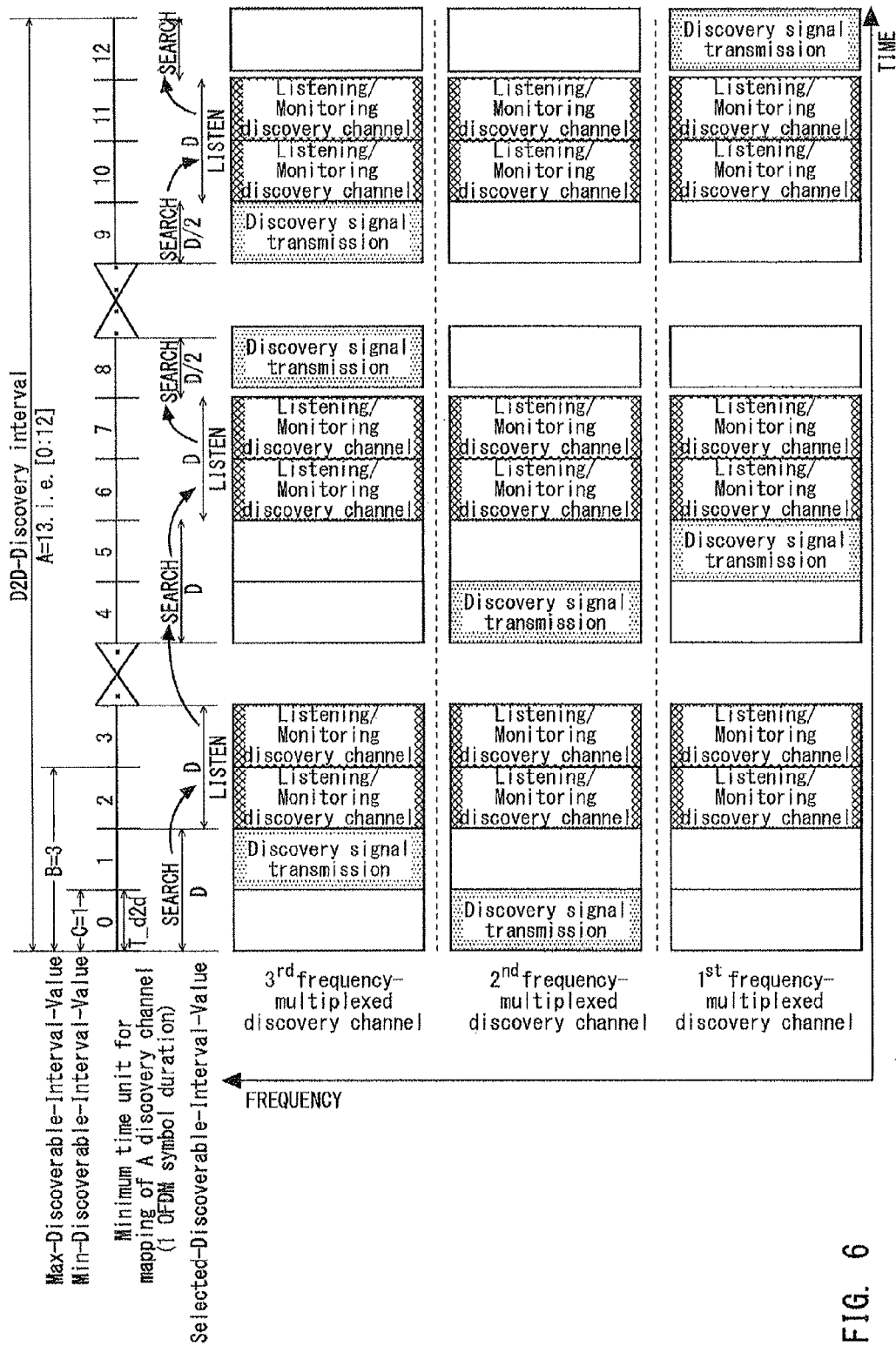
FIG. 6 contains diagrams relating to examples which help to illustrate a method for multiplexing discovery channels.
Figure 7:
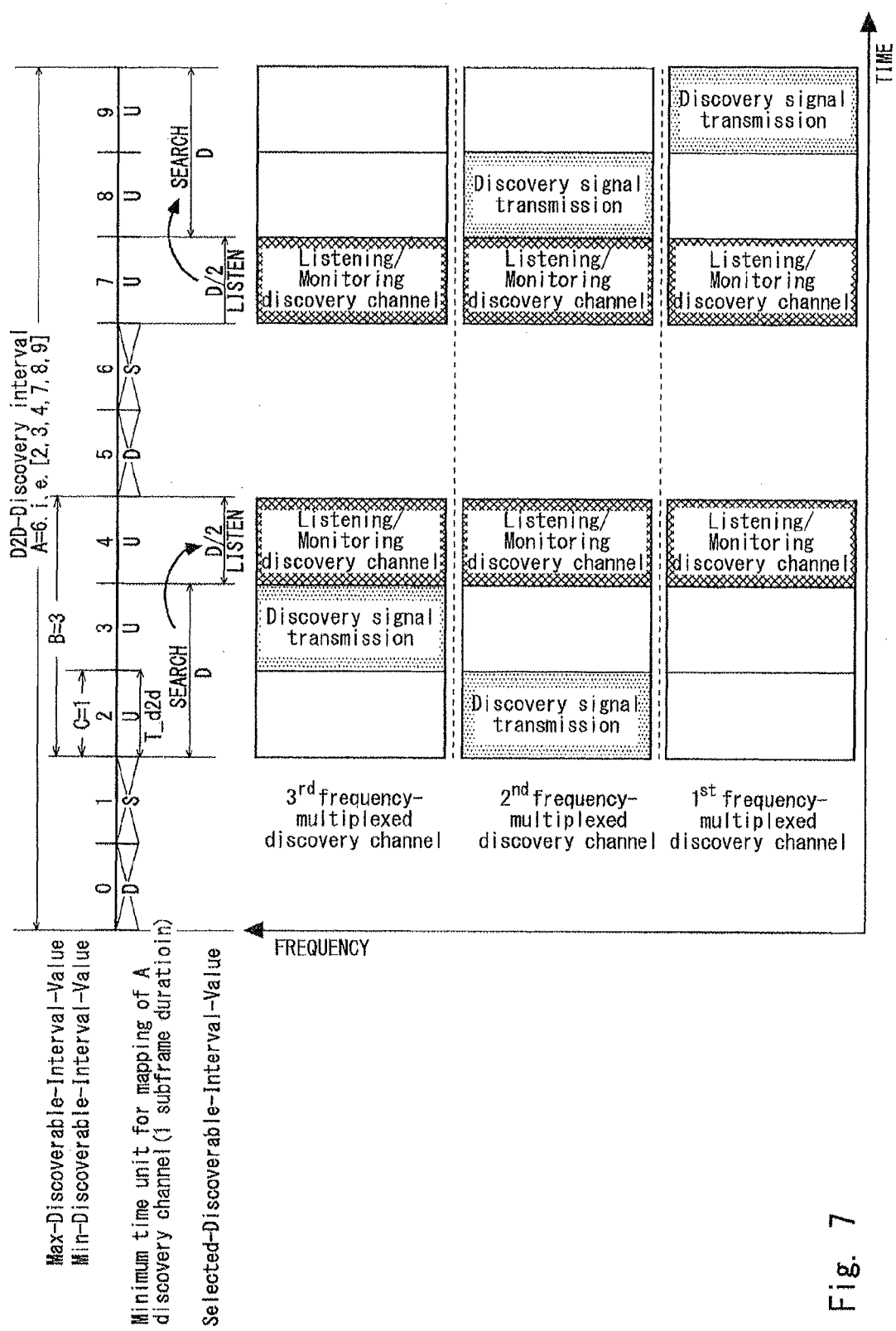
FIG. 7 contains diagrams relating to examples which help to illustrate a method for multiplexing discovery channels. The example in FIG. 6 is applicable for FDD and TDD, whereas the example in FIG. 7 is applicable for TDD only.

The proposed multiplexing scheme in the particular embodiment comprises A discovery channels which are time-multiplexed within a network configured D2D-Discovery interval, where A is an integer. In FIG. 6, A=13. In FIG. 7, A=6. The A time-multiplexed discovery channels may be consecutive or separated by OFDM symbol(s) or slot(s) or subframe(s). The idea of defining a network configured D2D-Discovery interval as A discovery channels which are multiplexed in time is to allow different D2D-UEs to independently select different numbers of time-multiplexed discovery channels as their respective discoverable intervals. This in turn helps to address or reduce the collision problem which was discussed by way of example above with reference to diagram 300. In FIGS. 6 and 7, a D2D-UE has selected two time-multiplexed discovery channels (i.e. D=2) as its discoverable interval. This leads to a scenario that there is at least one time-multiplexed channel on which there is at least one D2D-UE performing 'Search' and concurrently there is at least one D2D-UE performing 'Listen' and hence they have chance to discover each other.

Use of a time-multiplexed discovery channel, as discussed above, further allows multiple discovery channels to be multiplexed in frequencies or in orthogonal codes. In FIGS. 6 and 7, there are three discovery channels being multiplexed in frequency, namely the $1^{st}$, $2^{nd}$ and $3^{rd}$ frequency-multiplexed discovery channels. The idea of defining multiple frequency-multiplexed or code-multiplexed discovery channels on one time-multiplexed discovery channel is to further reduce the possibility of collision caused by more than one D2D-UE selecting the same time-multiplexed discovery channel for transmitting their discovery request signal. In FIGS. 6 and 7, a D2D-UE has selected the $2^{nd}$ frequency-multiplexed discovery channel in the first time-multiplexed discovery channel for transmitting its first discovery request signal, and it has selected the $3^{rd}$ frequency-multiplexed discovery channel in the second time-multiplexed discovery channel for transmitting its second discovery request signal. Additionally, defining multiple frequency-multiplexed or code-multiplexed discovery channels on one time-multiplexed discovery channel allows a D2D-UE to simultaneously monitor all frequency-multiplexed or code-multiplexed discovery channels.

With reference to FIG. 6, in one multiplexing scenario, the D2D discovery interval may span for A=13 time-multiplexed discovery channels. One such time-multiplexed discovery channel may correspond to one or more OFDM symbol duration(s), or one slot duration or one subframe duration of the overlaid FDD system. In the same scenario, the max-Discoverable-Interval-Value may be configured to B=3 while the Min-Discoverable-Interval-Value may be configured to C=1 such time units. Further, the minimum time unit for mapping of a discovery channel T_d2d may be equal to one OFDM symbol duration of the D2D channel while T_d2d may correspond to one or more OFDM symbol duration(s) of the overlaid FDD system. Further, in the multiplexing scenario shown in FIG. 6, the length of the SEARCH/LISTEN interval for a particular D2D-UE can be D=2 time units. During the two SEARCH time units, the device may randomly select two frequency blocks (each specified by the starting subcarrier index and the number of subcarriers) to transmit its discovery request signal. During the two LISTEN time units, the device will monitor all frequency blocks of the allocated bandwidth to detect other devices' discovery request signals. Then, in the next two SEARCH time units the device again randomly selects two frequency blocks and transmits its discovery signal. This procedure repeats until the end of the D2D discovery interval. Moreover, the overlaid cellular network may have the flexibility to allocate the D2D discovery interval either time-continuously or time-discontinuously. When one D2D discovery interval is allocated in time-discontinuous manner, SEARCH/LISTEN intervals may become discontinuous in time as illustrated in FIG. 6.

FIG. 7 illustrates another multiplexing scenario which may be applied to LTE/LTE-A TDD overlaid networks where TDD uplink subframes are used for D2D discovery signal transmission. In such a scenario, the D2D-discovery interval may last for A=6 uplink subframes, the Max-Discoverable-Interval Value B=3 uplink subframes and the Min-Discoverable-interval-Value C=1 uplink subframes. The minimum time unit for mapping of a discovery channel T_d2d may be equal to one uplink subframe duration of the overlaid TDD system. Further, in the multiplexing scenario shown in FIG. 7, the length of the SEARCH/LISTEN interval for a particular UE can be D=2 uplink subframes.

There are a number of benefits which may be provided by the various aspects and embodiments of the invention discussed above. Some of these are discussed below.

One benefit is that, whilst assistance from the overlaid cellular network is required for D2D discovery, nevertheless the level of such assistance is actually quite low meaning that the burden (e.g. signalling burden) imposed on the cellular network (or its base stations) remains low/minimal. The resource used for D2D discovery can also be semi statically configured by the cellular network/base station, and this again helps to reduce/minimise the burden on the cellular network/base station.

Also, because of the involvement of the cellular network in assisting D2D discovery, the cellular network retains control over the resource used for D2D discovery (and also for direct communication). This may enable access restriction by the cellular network. For example, in the case of an emergency, the network may reserve all of the D2D resource (i.e. the resource that might otherwise be used for D2D discovery and direct communication) or public safety usage. This might be also limited to a particular geographic area. Control by the network may also be used to accommodate, in addition to D2D discovery and communication, such things as advertising, group casting, D2D broadcasting, etc.

Another benefit is that a D2D-UE may be configured by the network for a longer sleep mode (in between D2D discovery attempts) in order to conserve power.

Yet another benefit is that a D2D-UE (like, for example, D2D-UE 108 in FIG. 1) which is outside the network coverage for data transmission but still within the network coverage for system information may still be able to utilise the network controlled D2D service.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The whole or part of the exemplary embodiments disclosed above can be described as, but not limited to, the following supplementary notes.

(Supplementary Note 1)
A method for use in device-to-device (D2D) discovery in a wireless communication network, wherein the network includes at least one base station and a plurality of D2D capable user equipments (D2D-UEs) and the network supports cellular communication and direct communication between D2D-UEs, the method comprising:
broadcasting D2D discovery system information (D2D-SIB) from the base station to D2D-UEs, wherein the D2D-SIB indicates frame(s)/subframe(s) for D2D-UEs to transmit and/or monitor for D2D discovery request signal(s) and frame(s)/subframe(s) for D2D-UEs to transmit and/or monitor for D2D discovery response signal(s), and
transmitting one or more D2D discovery request signal(s) from one D2D-UE, and upon receipt of a said D2D discovery request signal by another D2D-UE, transmitting from said other D2D-UE one or more D2D discovery response signal(s), said D2D discovery request signal(s) and said D2D discovery response signal(s) being transmitted on the frame(s)/subframe(s) indicated in the D2D-SIB.

(Supplementary Note 2)
The method as claimed in Supplementary note 1,
wherein the D2D-SIB includes one or more D2D resource-block sets, each D2D resource-block set comprising a pair of resource blocks, the said pair comprising a first resource block for transmitting discovery request signal(s) and a second resource block for transmitting discovery response signal(s).

(Supplementary Note 3)
The method as claimed in Supplementary note 2,
wherein the base station shares, via D2D-SIB, one or more D2D resource-block sets for D2D broadcasting.

(Supplementary Note 4)
The method as claimed in Supplementary note 3,
wherein only authorized D2D-UEs can utilise the shared D2D resource-block set(s) in broadcasting D2D message(s), and un-authorised D2D-UEs can only listen to broadcast D2D messages on the shared D2D resource-block set(s).

(Supplementary Note 5)
The method as claimed in Supplementary note 2,
wherein the first resource block and the second resource block are time-multiplexed.

(Supplementary Note 6)
The method as claimed in Supplementary note 5,
wherein the first resource block and the second resource block are allocated within the network's cellular uplink resource.

(Supplementary Note 7)
The method as claimed in Supplementary note 5,
wherein the first resource block comprises a plurality of time-multiplexed discovery channels.

(Supplementary Note 8)
The method as claimed in Supplementary note 7,
wherein each time-multiplexed discovery channel comprises one or more frequency-multiplexed discovery channels, or one or more code-multiplexed discovery channels, which can be transmitted by a D2D-UE.

(Supplementary Note 9)
The method as claimed in Supplementary note 8,
wherein for each time-frequency multiplexed discovery channel, or each time-code multiplexed discovery channel, there is a unique corresponding discovery response channel on which a discovery response signal can be transmitted by another D2D-UE.

(Supplementary Note 10)
The method as claimed in Supplementary note 9,
wherein the unique corresponding discovery response channel is mapped within the second resource block.

(Supplementary Note 11)
The method as claimed in Supplementary note 2,
wherein the D2D-SIB includes the following information elements (IEs):
access class barring information (D2D-ac-BarringInfo) for controlling use by a D2D-UE of a D2D resource-block set;
D2D discovery subframe configuration information (D2D-Discovery-SubframeConfig) enabling D2D-UEs to utilise a sleep mode to conserve power, and to periodically wake up from sleep mode to perform D2D discovery;
a maximum discoverable interval value (Max-Discoverable-Interval-Value) defining an integer maximum number of time multiplexed discovery channels that a D2D-UE can select as its own discoverable interval; and
a minimum discoverable interval value (Min-Discoverable-Interval-Value) defining an integer minimum number of time multiplexed discovery channel(s) that a D2D-UE can select as its own discoverable interval.

(Supplementary Note 12)
The method as claimed in Supplementary note 11,
wherein D2D-Discovery-SubframeConfig includes:
radio frame allocation period discovery information (radioframeAllocationPeriodDiscovery) and radio frame allocation offset discovery information (radioframeAllocationOffsetDiscovery), which indicate radio frame(s) in which the first resource block in a D2D resource-block set is/are mapped, the first resource block being mapped in radio frame(s) for which the equation $$\text{SFN mod(radioframeAllocationPeriodDiscovery)} = \text{radioframeAllocationOffsetDiscovery}$$

is satisfied;
discovery response offset information (DiscoveryResponseOffset) indicating the radio frame(s) that contain the associated second resource block of the said D2D resource-block set;

subframe allocation discovery information (subframeAllocationDiscovery) defining the subframes that are allocated for D2D discovery channel(s) mapping within the radio frame allocation period defined by radioframeAllocationPeriodDiscovery and radioframeAllocationOffsetDiscovery resource block assignment discovery information (resourceBlockAssignmentDiscovery) indicating physical resource block(s) in the subframe(s) that are allocated for D2D discovery channel(s) mapping;

subframe allocation response information (subframeAllocationResponse) defining the subframes that are allocated for D2D discovery response channel(s) mapping within radio frame allocation period defined by discoveryResponseOffset, and resource block assignment response information (resourceBlockAssignmentResponse) indicating physical resource block(s) in the subframe(s) that are allocated for D2D discovery response channel(s) mapping.

(Supplementary Note 13)

The method as claimed in Supplementary note 1 wherein, for frame(s)/subframe(s) not reserved for transmitting D2D discovery request signal(s) and corresponding D2D discovery response signal(s) or for broadcasting D2D message(s), if a D2D-UE does not have other scheduled cellular network activity on these frame(s)/subframe(s) then the D2D-UE enters a sleep mode to conserve power.

(Supplementary Note 14)

The method as claimed in Supplementary note 13, wherein the D2D-UE periodically wakes up from sleep mode prior to incoming frame(s)/subframe(s) that are reserved for transmitting D2D discovery request signal(s) and corresponding D2D discovery response signal(s) in order to perform D2D discovery to discover other nearby D2D-UE(s) and/or in order to be discovered by other nearby D2D-UE(s).

(Supplementary Note 15)

The method as claimed in Supplementary note 12 wherein, for frame(s)/subframe(s) not reserved for transmitting D2D discovery request signal(s) and corresponding D2D discovery response signal(s) or for broadcasting D2D message(s), if a D2D-UE does not have other scheduled cellular network activity on these frame(s)/subframe(s) then the D2D-UE enters a sleep mode to conserve power, the period of sleep mode being determined from the radioframeAllocationPeriodDiscovery, radioframeAllocationOffsetDiscovery, subframeAllocationDiscovery, DiscoveryResponseOffset, and subframeAllocationResponse provided in the D2D-SIB.

(Supplementary Note 16)

The method as claimed in Supplementary note 11, wherein a D2D-UE determines whether it is allowed to use an upcoming D2D resource-block set for D2D discovery from the D2D-ac-BarringInfo provided in the D2D-SIB.

(Supplementary Note 17)

The method as claimed in Supplementary note 16, wherein a D2D-UE randomly selects its own discoverable interval in the range from the Min-Discoverable-Interval-Value to the Max-Discoverable-Interval-Value provided in the D2D-SIB.

(Supplementary Note 18)

The method as claimed in Supplementary note 1, wherein a D2D-UE randomly selects either a "SEARCH" state or a "LISTEN" state to begin D2D discovery, and if the "SEARCH" state is selected the D2D-UE transmits a D2D discovery request signal and if the "LISTEN" state is selected the D2D-UE monitors for a D2D discovery request signal from another D2D-UE.

(Supplementary Note 19)

The method as claimed in Supplementary note 17, wherein a D2D-UE randomly selects either a "SEARCH" state or a "LISTEN" state to begin D2D discovery, and if the "SEARCH" state is selected, then for each time-multiplexed discovery channel(s) within the duration of the D2D-UE's own discoverable interval the D2D-UE transmits one or more D2D discovery request signal(s) on randomly selected frequency-multiplexed or code-multiplexed discovery channel(s), and if the "LISTEN" state is selected, then for each time-multiplexed discovery channel(s) within the duration of the D2D-UE's own discoverable interval the D2D-UE monitors all available frequency-multiplexed or code-multiplexed discovery channels for a D2D discovery request signal.

(Supplementary Note 20)

The method as claimed in Supplementary note 1, wherein the D2D-UE switches from the initially selected "SEARCH" state or "LISTEN" state to the other of the "LISTEN" state or "SEARCH" state.

(Supplementary Note 21)

The method as claimed in Supplementary note 19, wherein the D2D-UE switches from the initially selected "SEARCH" state or "LISTEN" state to the other of the "LISTEN" state or "SEARCH" state at the end of its own discoverable interval.

(Supplementary Note 22)

The method as claimed in Supplementary note 21, wherein the D2D-UE alternate between the "SEARCH" state and the "LISTEN" state on its own discoverable interval basis for the duration of the network configured discovery interval defined by subframeAllocationDiscovery provided in the D2D-SIB.

(Supplementary Note 23)

A wireless communication network including at least one base station and a plurality of D2D capable user equipments (D2D-UEs), wherein the network supports cellular communication and direct communication between D2D-UEs, the base station broadcasts D2D discovery system information (D2D-SIB) to D2D-UEs, wherein the D2D-SIB indicates frame(s)/subframe(s) for D2D-UEs to transmit and/or monitor for D2D discovery request signal(s) and frame(s)/subframe(s) for D2D-UEs to transmit and/or monitor for D2D discovery response signal(s), and a D2D-UE transmits one or more D2D discovery request signal(s), and upon receipt of a said D2D discovery request signal by another D2D-UE, the said other D2D-UE transmits one or more D2D discovery response signal(s), said D2D discovery request signal(s) and said D2D discovery response signal(s) being transmitted on the frame(s)/subframe(s) indicated in the D2D-SIB.

This application is based upon and claims the benefit of priority from Australian patent application No. 2013902574, filed on Jul. 12, 2013, the disclosure of which is incorporated herein in its entirety by reference.

REFERENCE SIGNS LIST

100 network
101 access node
102 access node
105-109 UE

The invention claimed is:

1. A method implemented in a base station used in a wireless communications network including a plurality of device-to-device (D2D) capable user equipments (D2D-UEs), the method comprising:

broadcasting a D2D discovery system information block (D2D-SIB) indicating one or more frames or one or more subframes for the D2D-UEs to transmit or monitor a D2D discovery request signal and to transmit or monitor a D2D discovery response signal, wherein a first D2D-UE in the plurality of D2D-UEs transmits, to a second D2D-UE in the plurality of D2D-UEs, the D2D discovery request signal in said one or more frames or said one or more subframes, wherein, upon receipt of the D2D discovery request signal, the second D2D-UE transmits, to the first D2D-UE, the D2D discovery response signal in said one or more frames or said one or more subframes, and wherein the D2D-SIB indicates one or more D2D resource-block sets, each D2D resource-block set comprising a pair of resource blocks, the pair comprising a first resource block for transmitting the D2D discovery request signal and a second resource block for transmitting the D2D discovery response signal.

2. The method as claimed in claim 1, wherein the base station shares, via the D2D-SIB, the one or more D2D resource-block sets for D2D broadcasting.

3. The method as claimed in claim 2, wherein an authorized D2D-UE in the plurality of D2D-UEs utilises the shared one or more D2D resource-block sets in broadcasting a D2D message, and an un-authorised D2D-UE listens to the broadcast D2D message on the shared one or more D2D resource-block sets.

4. The method as claimed in claim 1, wherein the first resource block and the second resource block are time-multiplexed.

5. The method as claimed in claim 4, wherein the first resource block and the second resource block are allocated within the wireless communications network's uplink resource.

6. The method as claimed in claim 4, wherein the first resource block comprises a plurality of time-multiplexed discovery channels.

7. The method as claimed in claim 6, wherein each time-multiplexed discovery channel comprises one or more frequency-multiplexed discovery channels, or one or more code-multiplexed discovery channels.

8. The method as claimed in claim 7, wherein each time-frequency multiplexed discovery channel or each time-code multiplexed discovery channel corresponds to a unique discovery response channel.

9. The method as claimed in claim 8, wherein the unique discovery response channel is mapped within the second resource block.

10. The method as claimed in claim 1, wherein the D2D-SIB includes the following information elements (Ws):

access class barring information controlling use of a D2D resource-block set;

D2D discovery subframe configuration information enabling the D2D-UEs to utilise a sleep mode, and to wake up from the sleep mode;

a maximum discoverable interval value defining an integer maximum number of time-multiplexed discovery channels that a D2D-UE in the plurality of D2D-UEs can select as a discoverable interval for the D2D-UE; and a minimum discoverable interval value defining an integer minimum number of time-multiplexed discovery channels that the D2D-UE can select as the discoverable interval for the D2D-UE.

11. The method as claimed in claim 10, wherein the D2D discovery subframe configuration information includes:

radio frame allocation period discovery information (radioframeAllocationPeriodDiscovery) and radio frame allocation offset discovery information (radioframeAllocationOffsetDiscovery), which indicate a radio frame in which the first resource block is mapped, wherein equation SFN mod (radioframeAllocationPeriodDiscovery)=radioframeAllocationOffsetDiscovery is satisfied;

discovery response offset information (DiscoveryResponseOffset) indicating a radio frame that contains the second resource block;

subframe allocation discovery information (subframeAllocationDiscovery) indicating a first subframe allocated for a D2D discovery channel mapped within a radio frame allocation period defined by radioframeAllocationPeriodDiscovery and radioframeAllocationOffsetDiscovery;

resource block assignment discovery information (resourceBlockAssignmentDiscovery) indicating a physical resource block in the first subframe allocated for the D2D discovery channel;

subframe allocation response information (subframeAllocationResponse) indicating a second subframe allocated for a D2D discovery response channel mapped within a radio frame allocation period defined by discoveryResponseOffset; and resource block assignment response information (resourceBlockAssignmentResponse) indicating a physical resource block in the second subframe allocated for the D2D discovery response channel.

12. In a wireless communications network including a base station and a plurality of device-to-device (D2D) capable user equipments (D2D-UEs), a method implemented in a D2D-UE in the plurality of D2D-UEs, the method comprising:

receiving a D2D discovery system information block (D2D-SIB) indicating one or more frames or one or more subframes for the D2D-UEs to transmit or monitor a D2D discovery request signal and to transmit or monitor a D2D discovery response signal; and transmitting, to another D2D-UE in the plurality of D2D-UEs, the D2D discovery request signal in said one or more frames or said one or more subframes, wherein, upon receipt of the D2D discovery request signal, said another D2D-UE transmits, to the D2D-UE, the D2D discovery response signal in said one or more frames or said one or more subframes, wherein the D2D-SIB indicates one or more D2D resource-block sets, each D2D resource-block set comprising a pair of resource blocks, the pair comprising a first resource block for transmitting the D2D discovery request signal and a second resource block for transmitting the D2D discovery response signal.

13. A method implemented in a wireless communications network including a base station and a plurality of device-to-device (D2D) capable user equipments (D2D-UEs), the method comprising:

broadcasting, from the base station, a D2D discovery system information block (D2D-SIB) indicating one or more frames or one or more subframes for the D2D-UEs to transmit or monitor a D2D discovery request signal and to transmit or monitor a D2D discovery response signal;

transmitting, from a first D2D-UE in the plurality of D2D-UEs to a second D2D-UE in the plurality of D2D-UEs, the D2D discovery request signal in said one or more frames or said one or more subframes; and upon receipt of the D2D discovery request signal, transmitting, from the second D2D-UE to the first D2D-UE, the D2D discovery response signal in said one or more frames or said one or more subframes, wherein the D2D-SIB indicates one or more D2D resource-block sets, each D2D resource-block set comprising a pair of resource blocks, the pair comprising a first resource block for transmitting the D2D discovery request signal and a second resource block for transmitting the D2D discovery response signal.

* * * * *